US012149878B2

(12) United States Patent
Wang et al.

(10) Patent No.: US 12,149,878 B2
(45) Date of Patent: Nov. 19, 2024

(54) ACOUSTIC DEVICES AND SUPPORT ASSEMBLIES THEREOF

(71) Applicant: SHENZHEN SHOKZ CO., LTD., Guangdong (CN)

(72) Inventors: Yonggen Wang, Shenzhen (CN); Zhiqing Liu, Shenzhen (CN); Zhen Wang, Shenzhen (CN); Xinnan Mao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 101 days.

(21) Appl. No.: 17/818,027

(22) Filed: Aug. 8, 2022

(65) Prior Publication Data

US 2022/0386014 A1 Dec. 1, 2022

Related U.S. Application Data

(63) Continuation of application No. PCT/CN2021/089244, filed on Apr. 23, 2021.

(30) Foreign Application Priority Data

Apr. 30, 2020 (CN) ......................... 202010367121.5
Apr. 30, 2020 (CN) ......................... 202020719557.1
(Continued)

(51) Int. Cl.
*H04R 1/10* (2006.01)
*H04R 25/00* (2006.01)

(52) U.S. Cl.
CPC ......... *H04R 1/1041* (2013.01); *H04R 1/1025* (2013.01); *H04R 1/105* (2013.01); *H04R 1/1066* (2013.01); *H04R 25/603* (2019.05)

(58) Field of Classification Search
CPC .... H04R 1/1041; H04R 5/033; H04R 1/1025; H04R 1/105; H04R 1/1066; H04R 25/603
(Continued)

(56) References Cited

U.S. PATENT DOCUMENTS 10,085,080 B2 9/2018 Bruss et al.
2018/0192181 A1* 7/2018 Oh ......................... H04R 1/083
2021/0014602 A1 1/2021 Li et al.

FOREIGN PATENT DOCUMENTS

CN 204168469 U 2/2015
CN 204948313 U 1/2016
(Continued)

OTHER PUBLICATIONS

International Search Report in PCT/CN2021/089244 mailed on Jul. 14, 2021, 7 pages.

*Primary Examiner* — Norman Yu
(74) *Attorney, Agent, or Firm* — METIS IP LLC

(57) ABSTRACT

The present disclosure discloses an acoustic device and a support assembly thereof. The support assembly may include a shell configured to provide a space for accommodating one or more components of the acoustic device. The support assembly may further include an interaction assembly configured to realize an interaction between a user and the acoustic device, wherein the interaction assembly include a first component and one or more second components, in response to receiving an operation of the user, the first component is configured to trigger at least one of the one or more second components to cause the acoustic device to perform a function corresponding to the at least one of the one or more second components.

20 Claims, 14 Drawing Sheets

(30) Foreign Application Priority Data

Apr. 30, 2020 (CN) ......................... 202020720150.0
Apr. 30, 2020 (CN) ......................... 202020725491.7

(58) Field of Classification Search
USPC .................................. 381/74, 312, 110, 122
See application file for complete search history.

(56) References Cited

FOREIGN PATENT DOCUMENTS

| | | | |
|---|---|---|---|
| CN | 204968063 | U | 1/2016 |
| CN | 205545801 | U | 8/2016 |
| CN | 206380059 | U | 8/2017 |
| CN | 107484054 | A | 12/2017 |
| CN | 209170616 | U | 7/2019 |
| CN | 209419804 | U | 9/2019 |
| CN | 211702348 | U | 10/2020 |
| CN | 211702351 | U | 10/2020 |
| CN | 212086437 | U | 12/2020 |
| JP | 2011114512 | A | 6/2011 |
| WO | 2016206029 | A1 | 12/2016 |

* cited by examiner

III-III

ACOUSTIC DEVICES AND SUPPORT ASSEMBLIES THEREOF

CROSS-REFERENCE TO RELATED APPLICATIONS

This application is a continuation of International Patent Application No. PCT/CN2021/089244, filed on Apr. 23, 2021, which claims priority to Chinese Patent Application No. 202020719557.1, filed on Apr. 30, 2020, Chinese Patent Application No. 202020720150.0, filed on Apr. 30, 2020, Chinese Patent Application No. 202020725491.7, filed on Apr. 30, 2020, and Chinese Patent Application No. 202010367121.5, filed on Apr. 30, 2020, the contents of each of which are incorporated herein by reference in their entirety.

TECHNICAL FIELD

The present disclosure relates to the field of sound transmission devices, in particular, to an acoustic device and a support assembly of the acoustic device.

BACKGROUND

Acoustic devices usually have functions of both microphone and speaker. As users have higher requirements for a voice effect and functionality of acoustic devices, it is necessary to design the structural components and wiring of an acoustic device to meet users' needs for product experience. Therefore, it is necessary to provide an acoustic device and a support assembly of the acoustic device with a simple structure and easy use.

SUMMARY

One aspect of the present disclosure may provide a support assembly for an acoustic device. The support assembly for the acoustic device may include a shell configured to provide a space for accommodating one or more components of the acoustic device; and an interaction assembly configured to realize interaction between a user and the acoustic device, wherein the interaction assembly includes a first component and one or more second components, in response to receiving an operation of the user, the first component may be configured to trigger at least one of the one or more second components to cause the acoustic device to perform a function corresponding to the at least one of the one or more second components.

In some embodiments, the first component may include a bracket provided on an outer wall of a side of the shell; the at least one of the one or more second components may include a key; the shell may be provided with one or more holes, the key is arranged on an inner wall of the side of the shell provided with the bracket, and the bracket may trigger the key under an external pressure to cause the acoustic device to perform the function corresponding to the key.

In some embodiments, the shell may include a first portion, a second portion, and a third portion, the first portion is configured to form the space, the space may be configured to accommodate a battery assembly or one or more control circuit assemblies of the acoustic device, the third portion may be configured to fix a core module of the acoustic device, the second portion may be connected with the first portion and the third portion and configured to hang on outside of ears of a user, at least one of the one or more holes may be opened on the third portion, and the core module may be configured to input and/or output sound.

In some embodiments, the second portion may be provided with a first groove, one end of the first groove communicates with the hole on the third portion, the bracket may be fixed and installed in the first groove and at least a portion of the bracket may cover the hole on the third portion.

In some embodiments, the bracket and the second portion may be in a bent shape, and cooperate with the first groove of the second portion to form a wire channel, a wire may extend from the core module to the first portion through the wire channel.

In some embodiments, the bracket may be provided with a second groove on a side facing the shell, so that when the bracket is fixed and installed in the first groove, the second groove and the first groove may cooperate with each other to form the wire channel.

In some embodiments, the first groove may include a first segment on the second portion and a second segment on the third portion, the depth of the first segment may be greater than the depth of the second segment, the bracket may include an fixing portion corresponding to the first segment and a pressing portion corresponding to the second segment, the thickness of the fixing portion may be greater than the thickness of the pressing portion, the second groove may be provided with the fixing portion, and the pressing portion may be configured to trigger the key.

In some embodiments, the first groove may further include a third segment on the first portion, and the depth of the first segment may be greater than a depth of the third segment.

In some embodiments, the first portion may further include an auxiliary member, the auxiliary member may be fixed in the first groove and fitted with the bracket.

In some embodiments, the bracket may be fixed and installed in the first segment, and the auxiliary member may extend into the second segment and the third segment.

In some embodiments, the third segment may be provided with a pit at an end of the third segment away from the first segment, and an end of the auxiliary member may be tilted from the first groove by pressing the auxiliary member into the pit.

In some embodiments, the bracket may cover the first segment and the second segment, the auxiliary member may be installed on the bracket, extended into the third segment, and cover the pit.

In some embodiments, the auxiliary member may include a sticker and the sticker may be attached to the bracket.

In some embodiments, the auxiliary member and the bracket may be an integral structural part.

In some embodiments, an adhesive strength between the auxiliary member and the bracket may be less than a fixing strength between the bracket and the second portion.

In some embodiments, the bracket may further include a first connecting portion connected between the fixing portion and the pressing portion, the first connecting portion may bend and extend toward a side away from the shell relative to the fixing portion, and the pressing portion may bend and extend toward a side close to the shell relative to the first connecting portion.

In some embodiments, a side of the pressing portion close to the shell may be provided with a key bulge, so that when the pressing portion is pressed by an external force, the key bulge triggers the key.

In some embodiments, another end of the fixing portion of the bracket away from the pressing portion may be provided with a second connecting portion, and the thickness of the second connecting portion may be less than the thickness of the fixing portion.

In some embodiments, the bracket may be further provided with a third connecting portion at an end of the bracket close to the third portion, the third connecting portion may be configured to form a clamping connection with an inner surface of the side of the third portion with the bracket to prevent an end of the bracket from being lifted the first groove.

In some embodiments, the support assembly may further include a seal component, the seal component may be arranged between the key and the third portion.

In some embodiments, the acoustic device may include a core module, a battery assembly, and the support assembly, the core module may be provided at an end of the support assembly, and the battery assembly may be provided at another end of the support assembly.

Additional features of the present disclosure may be described in the following description. Through the study of the following description and corresponding drawings or the understanding of the production or operation of the embodiment, some additional features of the present disclosure are obvious to those skilled in the art. The features of the present disclosure can be realized and obtained by practice or using various aspects of the methods, tools and combinations described in the following embodiments.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
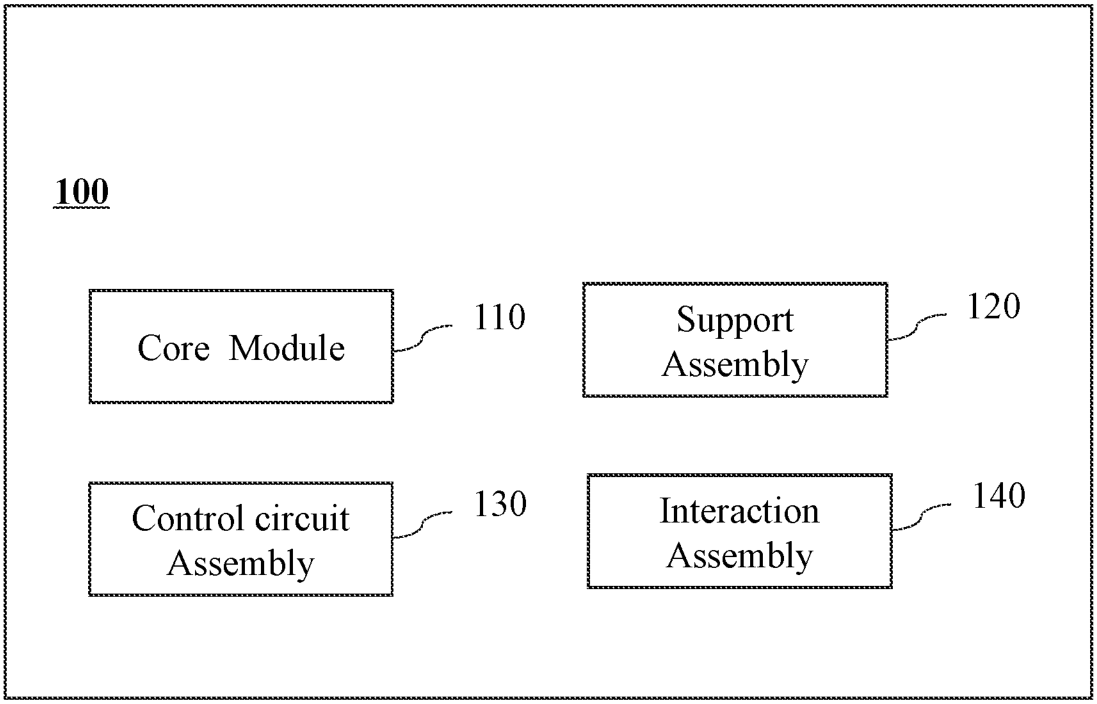
FIG. 1 is a structure diagram illustrating an exemplary acoustic device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It should be understood that, in order to facilitate the description of the present disclosure, the positional relationship indicated by the terms "end", "upper surface", lower surface", "upper", "lower", "top", "bottom", "inner", "outer", "axial", "radial", "peripheral", "outer" and so on is based on the positional relationship shown in the attached drawings, rather than indicating that the device, component or unit referred to must have a specific positional relationship, which cannot be understood as a restriction on the present disclosure.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

FIG. 1 is a structure diagram illustrating an exemplary acoustic device according to some embodiments of the present disclosure. In some embodiments, an acoustic device 100 may input and/or output sound. For example, the acoustic device 100 may have functions of, for example, a speaker, a microphone, a hearing aid, etc. In some embodiments, the acoustic device 100 may be configured to acquire sound to generate an audio signal (i.e., a mechanical vibration signal) and convert the audio signal into an electrical signal. In some embodiments, the acoustic device 100 may be configured to convert an electrical signal into an audio signal (i.e., a mechanical vibration signal). In some embodiments, the acoustic device 100 may be configured to convert an audio signal (i.e., a mechanical vibration signal) into an electrical signal, and may be configured to convert an electrical signal into an audio signal (i.e., a mechanical vibration signal). In some embodiments, the acoustic device 100 may include a bone conduction earphone, a bone conduction microphone, a bone conduction speaker, a bone conduction sound transmission device, an air conduction earphone, an air conduction microphone, an air conduction speaker, or an air conduction sound transmission device. As shown in FIG. 1, the acoustic device 100 may include a core module 110, a support assembly 120, a control circuit assembly 130, and an interaction assembly 140.

In some embodiments, the core module 110 may be configured to implement functions of the acoustic device 100. The core module 110 may include at least one of an audio output component or an audio input component. In some embodiments, the audio output component may input sound to a user. Merely by way of example, the audio output component may include a speaker component. In some embodiments, the audio input component may be configured to acquire external sound. Merely by way of example, the audio input component may include a sound pickup component. The sound pickup component may be configured to acquire the user's voice, the environment sound of the user's environment, or the like. For example, the sound pickup component may include a bone conduction microphone, an air conduction microphone, etc., or a combination thereof. For example, the audio input component may convert the acquired sound (i.e., a mechanical vibration) into an electrical signal including sound content, and transmit the electrical signal to the audio output component. The audio output component may convert the received electrical signal into a mechanical vibration, and transmit the mechanical vibration to the user's auditory nervous system through bone conduction, so that the user may hear the sound, thereby achieving the function of the hearing aid of the acoustic device 100. In some embodiments, the core module of the acoustic device, 110 may be arranged in the support assembly 120 and electrically connected with other assemblies of the acoustic device 100 (e.g., the control circuit assembly 130).

In some embodiments, there may be one or more core modules 110. In some embodiments, there may be one single core module 110, and the core module 110 may be arranged at either end of the support assembly 120. In some embodiments, there may be a plurality of the core modules 110, and the plurality of core modules 110 may be respectively arranged at both ends of the support assembly 120. More information about the core module 110 may refer to the description of other parts, such as the detailed description of FIGS. 2 and 9.

In some embodiments, the support assembly 120 may be configured to support other assemblies of the acoustic device 100, such as the core module 101, the control circuit assembly 130, and the interaction assembly 140. In some embodiments, the support assembly 120 may include an interaction assembly 140. In some embodiments, the support assembly 120 may include a hanging assembly. In some embodiments, the 3 assembly may be configured to hang the acoustic device 100 on the user's body. For example, the hanging assembly may include an ear hanger assembly. The ear hanger assembly may be configured to hang the acoustic device 100 on a user's ear. In some embodiments, the support assembly 120 may include a rear hanger assembly. The rear hanger assembly may be connected with the ear hanger assembly and realize the acoustic device 100 to be stably worn. In some embodiments, the support assembly 120 may be physically connected with other assemblies of the acoustic device 100, such as the core module 110, the control circuit assembly 130, and the interaction assembly 140. Merely by way of example, the physical connection may include injection molding connection, welding, riveting, bolt, bonding, clamping, etc., or any combination thereof.

In some embodiments, the support assembly 120 (e.g., the ear hanger assembly) may be configured to provide a space for accommodating one or more components of the acoustic device 100. For example, the core module 110 and the control circuit assembly 130 may be accommodated in the space inside the ear hanger assembly. In some embodiments, the support assembly 120 (e.g., the ear hanger assembly) may include a first portion, a second portion, and a third portion. In some embodiments, the first portion may be configured to provide a space for accommodating one or more components of the acoustic device 100. For example, at least parts of elements in the core module 110, or the control circuit assembly 130 may be configured to accommodate the space. In some embodiments, the third portion may be configured to fix or connect the core module 110. For example, the third portion may be configured to connect an audio output component (e.g., a bone conduction speaker). In some embodiments, the second portion may be connected with the first portion and the third portion for hanging outside the user's ear. In some embodiments, the second portion may be arranged in a bent shape.

In some embodiments, the support assembly 120 may include a shell, which may be provided with one or more holes (e.g., a sound pickup hole, a hole for fitting a key (i.e., a key adaptation hole), etc.). In some embodiments, at least one of the one or more holes may be opened on the third portion. In some embodiments, at least one of the one or more holes may be opened on the first portion or the second portion. In some embodiments, the one or more holes may be configured to accommodate elements in the interaction assembly 140. In some embodiments, the one or more holes may be used for the core module 110 acquiring sound (also referred to as the sound pickup hole). For example, the audio input component may acquire external sound through the sound pickup hole. More information about the one or more holes may refer to the description of other parts, such as the detailed description of FIGS. 5 and 6.

In some embodiments, the first portion, the second portion, and/or the third portion in the support assembly 120 may be provided with a first groove. In some embodiments, the first groove may accommodate the interaction assembly 140 (e.g., a wire or a first portion). More information about the first portion may refer to the description in FIG. 1. In some embodiments, the first portion may be provided with the first groove. In some embodiments, the second portion and the third portion may be provided with the first groove. The first groove may include a first segment on the second portion and a second segment on the third portion. In some embodiments, the depth of the first segment may be greater than the depth of the second segment. In some embodiments, the second segment may communicate with and/or connect holes on the third portion. The first groove may further include a third segment on the first portion. In some embodiments, the depth of the first segment may be greater than the depth of the third segment. In some embodiments, the third segment may be provided with a pit at an end away from the first segment. More information about the first groove, the first segment, the second segment, the third groove, and the pit may refer to the description in other parts of the present disclosure, such as the detailed description in FIGS. 4-6.

In some embodiments, the control circuit assembly 130 may be configured to control other assemblies of the acoustic device 100 (e.g., the core module 110) to implement the functions of the acoustic device 100. The control circuit assembly 130 may be arranged in the space provided by the ear hanger assembly and electrically connected with other assemblies of the acoustic device 100 (e.g., the core module of the acoustic device, 110). Merely by way of example, the control circuit assembly 130 may include one or more circuit boards arranged in the space provided by the ear hanger assembly. The one or more circuit boards may be electrically connected with other assemblies controlling the acoustic device 100 (e.g., the core module 110) to control operations of the acoustic device 100 and implement corresponding operations, such as volume control, switch on/switch off, earphone mode selection, wireless connection or data transmission.

In some embodiments, the one or more circuit boards may include a main control circuit board. The main control circuit board may be configured to control the core module 110 to convert an electrical signal into a mechanical vibration. In some embodiments, the main control circuit board may be arranged in the space provided by the ear hanger assembly of the support assembly 120. In some embodiments, the main control circuit board and the core module 110 may be arranged at the same end of the support assembly 120 or at two ends of the support assembly 120, respectively. In some embodiments, the main control circuit board may be connected with the core module 110 through the wire. More information about the main control circuit board may refer to the description in other parts of the present disclosure, such as the detailed description in FIG. 3.

In some embodiments, the interaction assembly 140 may be configured to facilitate interaction between a user and the acoustic device 100. For example, the interaction assembly 140 may be configured to facilitate interaction between the user and the core module 110. For example, the interaction assembly 140 may be configured to facilitate interaction between the user and the main control circuit board 130. Further, the interaction assembly 140 may trigger the control circuit assembly to control the acoustic device 100 (e.g., the core module 110) to implement the function corresponding to an instruction of the user in response to receiving the instruction of the user. For example, the interaction assembly 140 may control the control circuit assembly to implement a switch on/off function of the acoustic device 100 in response to receiving a pressing instruction of the user.

In some embodiments, the interaction assembly 140 may include a first component arranged on the support assembly 120 (e.g., the ear hanger assembly) and a second component arranged on the core module 110 (e.g., the control circuit assembly). For example, the interaction assembly 140 may include a first component arranged on the shell of the ear hanger assembly, and the second component arranged on one of the one or more circuit boards (e.g., the main control circuit board) on the control circuit assembly. The first component may be configured to receive an instruction of the user. The instruction of the user may be in a form of force, sound, or the like. For example, the user may generate an instruction of the user by pressing, touching, or the like. In some embodiments, the first component may include one or more keys, such as a volume key and a function key. The second component may trigger the control circuit 130 to control the core module 110 to implement the function corresponding to the instruction of the user, such as play/pause, switch on/off, etc., in response to the instruction of the user (e.g., pressing, touching) received by the first component. In some embodiments, the second component may include one or more switches, such as a mechanical switch, a voice switch, or the like. Merely by way of example, the first component (e.g., the one or more keys) may pull the second component (e.g., the mechanical switch) to trigger the control circuit assembly to implement the function corresponding to the second component. As another example, the second component may trigger the control circuit assembly to implement the function corresponding to the second component in response to a certain intensity of sound.

In some embodiments, the interaction assembly 140 may include the first component arranged on the support component 120 and the one or more second components. The first component may be configured to trigger at least one of the one or more second components to cause the acoustic device 100 to perform a function corresponding to at least one of the one or more second components in response to receiving an operation of the user. In some embodiments, the first component may include a bracket. In some embodiments, the bracket may be provided on an outer wall of the support assembly 120. In some embodiments, the bracket may be embedded and installed in the first groove. In some embodiments, the bracket may be embedded and installed in the first segment to cover the first segment. In some embodiments, the bracket may completely cover the second segment and holes on the third portion. In some embodiments, the bracket may partially cover the second segment and the holes on the third portion. In some embodiments, the at least one of the one or more second components may include a key. The key may be arranged in the space of the support assembly 120 and correspond to a hole (which may be referred to as a key adaptation hole). For example, the key may be at least partially accommodated in a hole in the shell of the support assembly 120. As another example, the key may be arranged in an accommodating space of the support assembly 120 at a position where a projection of the hole along a direction perpendicular to an opening of the hole is located, and arranged near the holes. When the bracket is pressed by an external pressure, the key may be triggered. In some embodiments, the key may be arranged on an inner wall of the side of the support assembly 120 provided with the bracket. In some embodiments, the key may be configured to control the volume of the acoustic device 100 up or down. In some embodiments, the key may be configured to control switching of a playback function of the acoustic device 100 (e.g., play songs, play current events, play audiobooks). In some embodiments, the bracket may trigger the key under the external pressure to cause the acoustic device 100 to perform the function corresponding to the key. In some embodiments, the function corresponding to the key may be configured to control the acoustic device 100 to switch on/off. When the bracket is pressed by an external pressure, the key may be triggered to realize the acoustic device 100 to switch on/off. In some embodiments, the function corresponding to the key may be configured to control the volume of the acoustic device 100 up or down. When the bracket is pressed by an external pressure, the key may be triggered to realize the acoustic device 100 to perform the function of controlling the volume of the acoustic device 100 to up or down. In some embodiments, the function corresponding to the key may be configured to control the switching of the playback function of the acoustic device 100. When the bracket is pressed by an external pressure, the key may be triggered to realize the acoustic device 100 to perform switching of the playback function.

Figure 5:
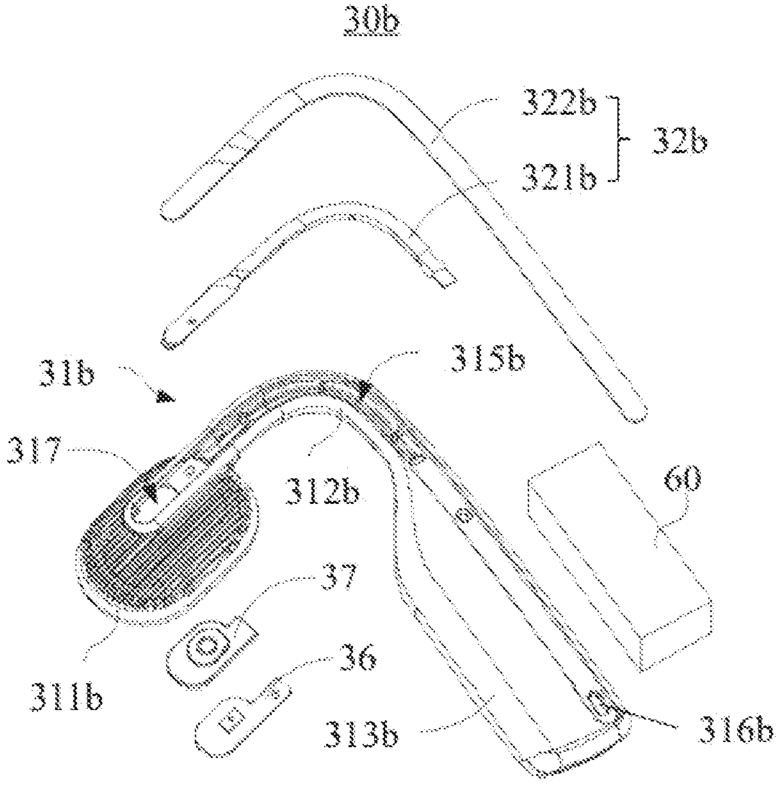
FIG. 5 is another structure diagram illustrating disassembled structures of an exemplary ear hanger assembly in FIG. 2 according to some embodiments of the present disclosure.
Figure 8:
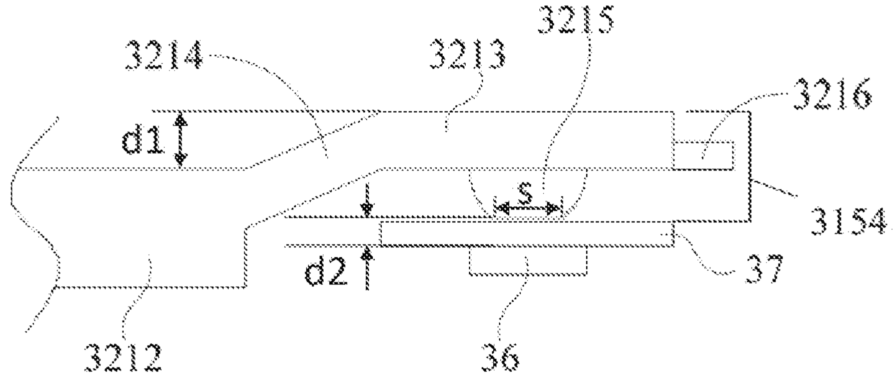
FIG. 8 is a schematic diagram illustrating an exemplary decorative bracket triggering a key in FIG. 5 according to some embodiments of the present disclosure.

More information about the key may refer to the description in other parts of the present disclosure, such as the detailed description in FIGS. 5 and 8.

In some embodiments, the bracket and the second portion may be correspondingly arranged in a bent shape. In some embodiments, the bracket may be provided with a second groove on a side facing the support assembly 120, so that when the bracket is embedded and installed in the first groove, the bracket may cooperate with the first groove of the second portion to provide a channel. In some embodiments, the core module 110 may be physically connected with the third portion, and the control circuit assembly 130 and/or a battery assembly may be accommodated in a space of the first portion. The control circuit assembly 130 and/or the battery assembly and the core module 110 may be connected through the connection between the control circuit module 130 and/or the battery module and the core module 110 (e.g., an electrical connection (such as the wire) or a communication connection (such as a cable) may extend from within the core module 110 through the channel into the first portion).

In some embodiments, the bracket may include a fixing portion and a pressing portion. The fixing portion may be configured to fix the bracket in the first groove. The pressing portion may be arranged on the bracket at a position corresponding to the key adaption hole, and the pressing portion may be configured to trigger the key corresponding to the key adaption hole. In some embodiments, the fixing portion may be arranged in the first segment, and the pressing portion may be arranged in the second segment. In some embodiments, the second groove on the bracket may be arranged on the fixing portion. In some embodiments, the bracket may further include a first connecting portion connected the fixing portion and the pressing portion. In some embodiments, the first connecting portion may be bent and extended toward a side away from the shell relative to the fixing portion, and the pressing portion may be bent and extended toward a side close to the shell relative to the first connecting portion. In some embodiments, the thickness of the fixing portion in a direction perpendicular to a surface of the shell of the support assembly 120 may be greater than the thickness of the pressing portion, so that the pressing portion may have a space to move toward the surface of the shell of the support assembly 120, and the key may be triggered. In some embodiments, a side of the pressing portion close to the shell may be provided with a key protrusion for triggering the key. In some embodiments, the first connecting portion may be elastic. When the pressing portion is subjected to pressure, the first connecting portion may be bent and deformed, and the key protrusion may move towards the key adaption hole under pressure to press and trigger the key. In some embodiments, the size of the pressing portion in a direction parallel to the surface of the housing may be smaller than the size of the key adaption hole, so that the pressing portion may move within the key adaption hole under pressure, and the key corresponding to the key adaptation hole may be further triggered.

In some embodiments, another end of the fixing portion of the bracket away from the pressing portion may be further provided with a second connecting portion. In some embodiments, the thickness of the second connection portion may be smaller than the thickness of the fixing portion. In some embodiments, an end of the bracket close to the third portion (an end of the pressing portion away from the fixing portion) may be provided with a third connecting portion. The third connecting portion may be configured to provide a snap connection with an inner surface of the side of the third portion with the bracket to prevent the end of the bracket from being lifted from the first groove.

In some embodiments, the bracket may be referred to as a bracket 321*a* and a bracket 321*b*. More information about the bracket, the second groove, the fixing portion, the pressing portion, the first connecting portion, the second portion, and the third portion may refer to the description in other parts of the present disclosure.

In some embodiments, the first component may include an auxiliary member. In some embodiments, the auxiliary member may be snugly mounted on the bracket. In some embodiments, the auxiliary member may be physically connected (e.g., glued or snapped) to the bracket by a decorative layer. In some embodiments, the auxiliary member may include a sticker and the sticker may be attached to the bracket. In some embodiments, the sticker may include a facestock, a film layer, an adhesive, and a backing paper. In some embodiments, the facestock may include art paper, textured paper, clear polyvinyl chloride, kraft paper, polypropylene, or the like. In some embodiments, the film layer may include transparent polyester, translucent polyester, transparent polyvinyl chloride, glossy white polyvinyl chloride, matt white polyvinyl chloride, synthetic paper, or the like. In some embodiments, types of the adhesives may include a universal super adhesive type, a universal strong adhesive type, a refrigerated food strong adhesive type, a universal re-uncovering type, and a fiber re-uncovering type. In some embodiments, the backing paper may include white, blue, yellow gracine paper, garlic paper, kraft paper, polyester, coated paper, polyethylene, or the like. In some embodiments, the auxiliary member may be a plastic component which is clamped to the bracket. In some embodiments, the auxiliary member and the bracket may be an integral structural part. In some embodiments, the adhesive strength between the auxiliary member and the bracket may be less than the fixing strength between the bracket and the second portion. Since the fixing strength between the bracket and the second portion is greater, the bracket and the second portion may not be separated due to the excessive bonding strength between the bracket and the auxiliary member when the auxiliary member is replaced with an external pressure. In some embodiments, the auxiliary member may extend into the second segment and the third segment of the first groove. In some embodiments, the auxiliary member may completely or partially cover the second segment of the first groove. In some embodiments, the auxiliary member may completely or partially cover the third segment of the first groove. In some embodiments, the auxiliary member may cover the pit on the third segment. Since the bracket mainly covers the first segment and the second segment and does not cover the third segment, the part of the auxiliary member on the third segment may be attached directly to the third segment and cover the pit. The auxiliary member may be pressed into the pit on the third segment by applying the external pressure. Due to the small stiffness of the auxiliary member, the end (or the edge) of the auxiliary member may be lifted from the first groove, the user or the operator may tear the auxiliary member from the lifted end (or the edge) for replacement. In some embodiments, the auxiliary member may be referred to as an auxiliary member 322. More information about the adhesive strength, fixing strength, and the auxiliary member 322 may refer to the description in other parts of the present disclosure, such as the detailed description in FIGS. 3 and 5.

In some embodiments, the support assembly 120 may include a seal component. In some embodiments, the seal component may be provided between the key and the third portion. For example, the seal component may be disposed between the key and the third portion and cover the key adaption hole corresponding to the key on the third portion from an inner side of the third portion. For example, the material of the seal component may include silicone, rubber, etc. In some embodiments, the seal component may include a membrane.

In some embodiments, the acoustic device 100 may further include a battery assembly (not shown). The battery assembly may be configured to power the acoustic device 100. In some embodiments, the battery assembly may be arranged in the space of the first portion of the support assembly 120. In some embodiments, the battery assembly and the core module 110 may be arranged at the same end of the support assembly 120 or at two ends of the support assembly 120, respectively. In some embodiments, the battery assembly may be connected with the core module 110 through a wire. More information about the battery assembly may refer to the description in other parts of the present disclosure, such as the description of a battery 60 in FIG. 5.

It should be noted that above description about the acoustic device 100 is merely provided for purpose of illustration, and is not intended to limit the scope of the present disclosure. For those skilled in the art, various modifications and changes may be made to the acoustic device 100 under the guidance of the present disclosure. However, these modifications and changes are still within the scope of the present disclosure.

Figure 2:
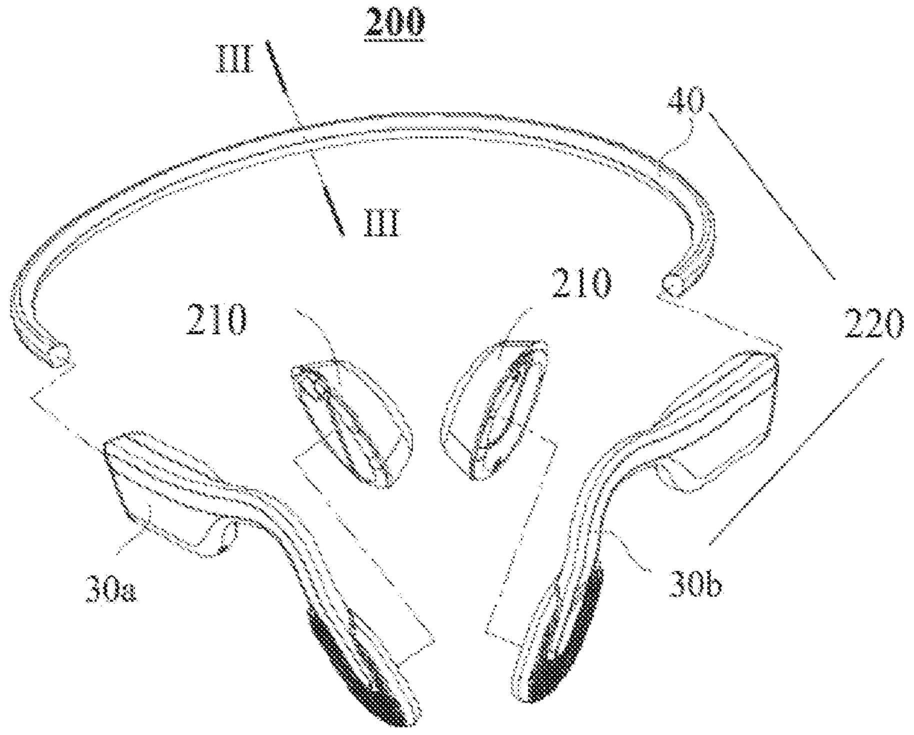
FIG. 2 is a structure diagram illustrating disassembled structures of an exemplary acoustic device according to some embodiments of the present disclosure.

FIG. 2 is a structure diagram illustrating disassembled structures of an exemplary acoustic device according to some embodiments of the present disclosure. As shown in FIG. 2, the acoustic device 200 may include two core modules 210, and a support assembly 220 (also be referred to a support assembly 120). The support assembly 220 may include two ear hanger assemblies (i.e., an ear hanger assembly 30*a* and an ear hanger assembly 30*b*) and a rear hanger assembly 40. The acoustic device 200 may include an interaction assembly, a control circuit assembly, and a battery assembly (not shown in FIG. 2). An end of each of the two hang assemblies may be connected with one of the two core modules 210, and both ends of the rear hanger assembly 40 may be respectively connected with the other end of each of the two ear hanger assemblies away from the core modules 210. In some embodiments, two ear hanger assemblies may be respectively hung on the outside of the user's two ears, and the rear hanger assembly 40 may be arranged around the back of the user's head or neck to meet the user's need of wearing the acoustic device 200. In this way, when the acoustic device 200 is in the wearing state, the two core modules 210 may be respectively located on the left and right sides of the user's head; with the cooperation of the two ear hanger assemblies and the rear hanger assembly 40, the two core modules 210 may clamp the user's head and contact the user's skin to realize sound transmission based on bone conduction technology.

In some embodiments, the configuration of the two ear hanger assemblies may be the same. For example, each of the two ear hanger assemblies may include a first portion, a second portion, and a third portion. Each of the two ear hanger assemblies may include an interaction assembly. More information about the first portion, the second portion, the third portion, and the interaction assembly may refer to FIG. 1. In some embodiments, the configurations of the two hang assemblies may be different. For example, one of the two ear hanger assemblies (e.g., the ear hanger assembly 30*a*) may be configured with an interaction assembly, and the other (e.g., the ear hanger assembly 30*b*) may not include an interaction assembly. As described herein, the configuration of the ear hanger assembly may refer to relevant parameter information such as the structure (e.g., shape, size, etc.) of the ear hanger assembly, components, and other components installed in and/or on the ear hanger assembly.

In some embodiments, the control circuit assembly and the battery assembly may be arranged in the same ear hanger assembly. In some embodiments, the control circuit assembly and the battery assembly may be respectively arranged in the two ear hanger assemblies, and the specific structure may be described in detail later. Both the control circuit assembly and the battery assembly may be connected with the two core modules 210 through a wire (not shown in FIG. 2), the control circuit assembly may be configured to control the sound generation of the core modules 210 (e.g., converting an electrical signal into a mechanical vibration), and the battery assembly may be configured to provide an electrical energy to the acoustic device 200 (e.g., the two core modules 210). In some embodiments, the acoustic device 200 may include microphones such as a microphone, a pickup, and other communication elements such as Bluetooth, which may be connected with the control circuit assembly and the battery assembly through the wire to achieve corresponding functions. In some embodiments, the above-mentioned wire may be a wire, which may be configured to achieve electrical connection between various electronic components of the acoustic device 200. In some embodiments, if there are a plurality of circuits that need to be electrically connected, the wire may be correspondingly arranged in a plurality of strands, and then the wire may be a plurality of strands of the wires.

It should be noted that: the core modules 210 may be provided with two, and both the two core modules 210 may make sounds, which mainly in order to facilitate the acoustic device 200 to realize stereo sound effects, thereby improving the user favorability of the acoustic device 200. Therefore, in other application scenarios where stereophonic requirements are not particularly high, such as hearing aids for hearing patients, live teleprompter for hosts, etc., the acoustic device 200 may only be provided with one core module.

Figure 3:
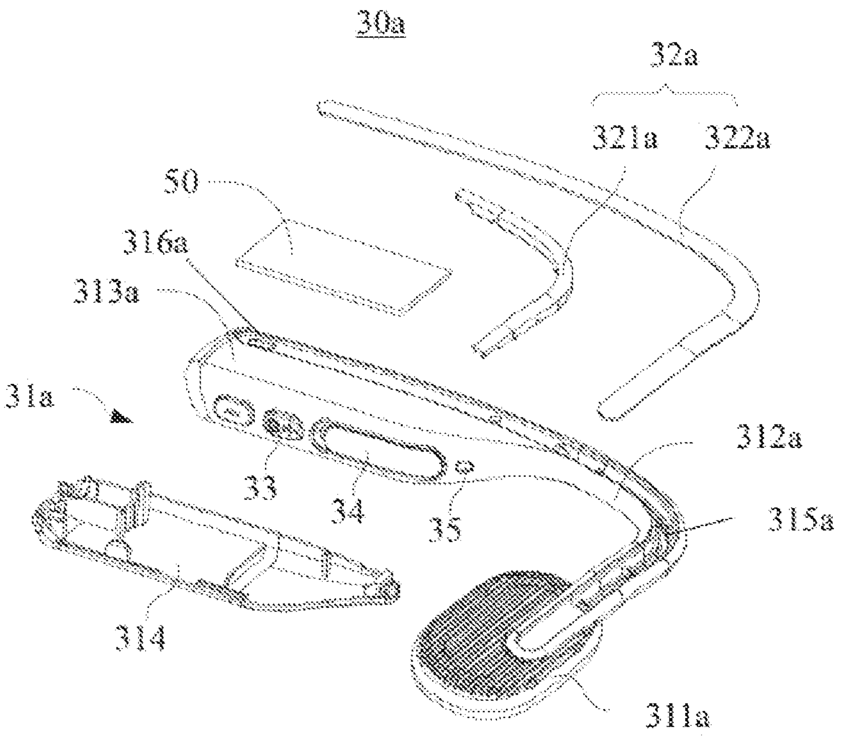
FIG. 3 is a structure diagram illustrating disassembled structures of an exemplary ear hanger assembly in FIG. 2 according to some embodiments of the present disclosure.
Figure 4:
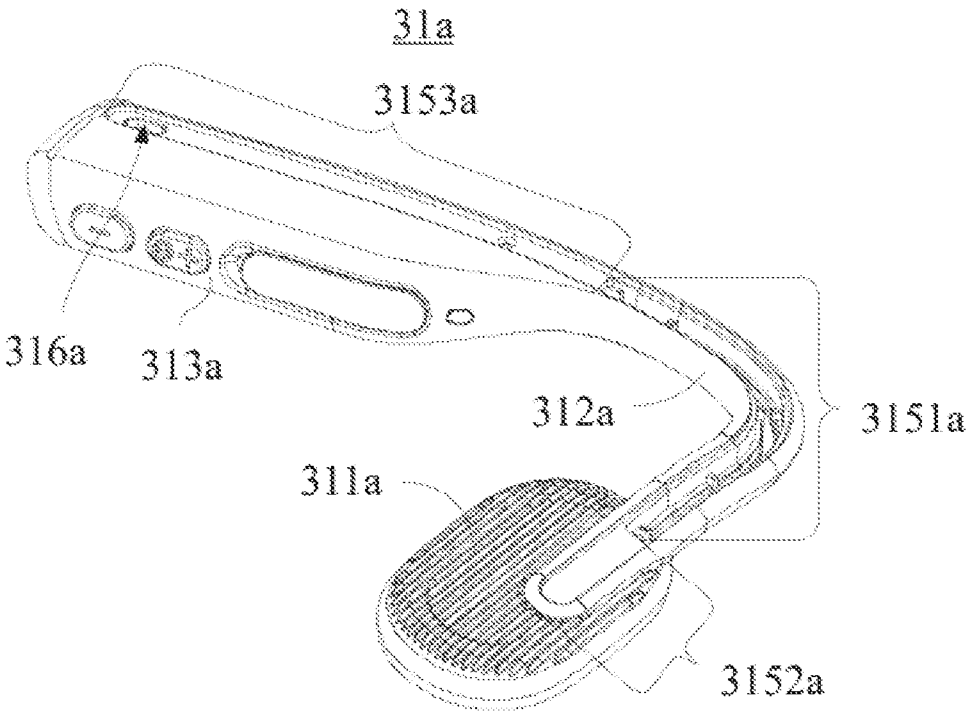
FIG. 4 is a structure diagram illustrating an exemplary shell of the ear hanger assembly in FIG. 3 according to some embodiments of the present disclosure.
Figure 6:
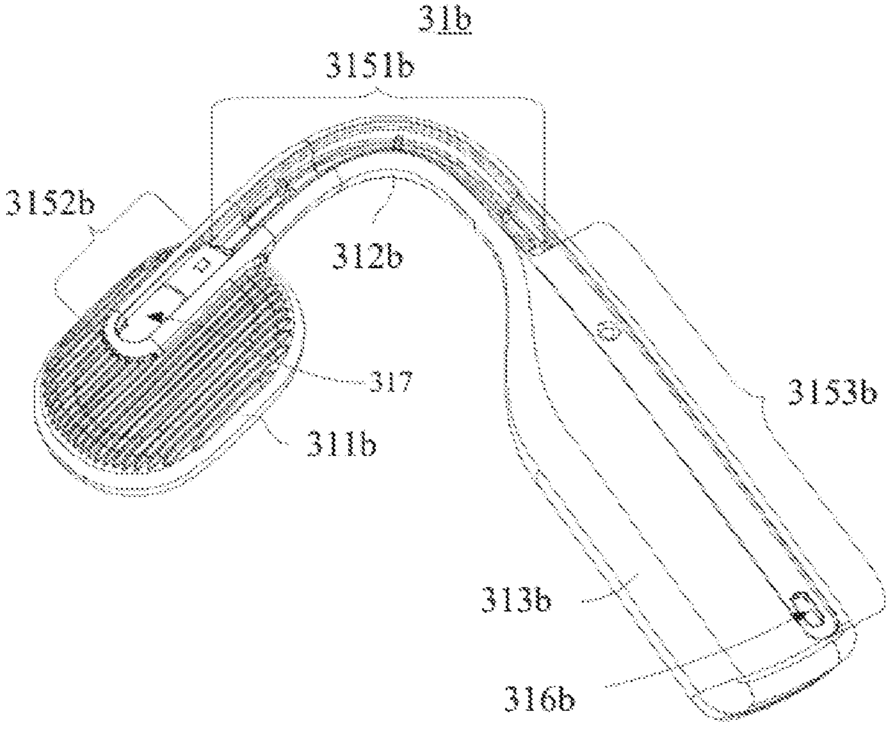
FIG. 6 is a structure diagram illustrating an exemplary shell of the ear hanger assembly in FIG. 5 according to some embodiments of the present disclosure.
Figure 7:
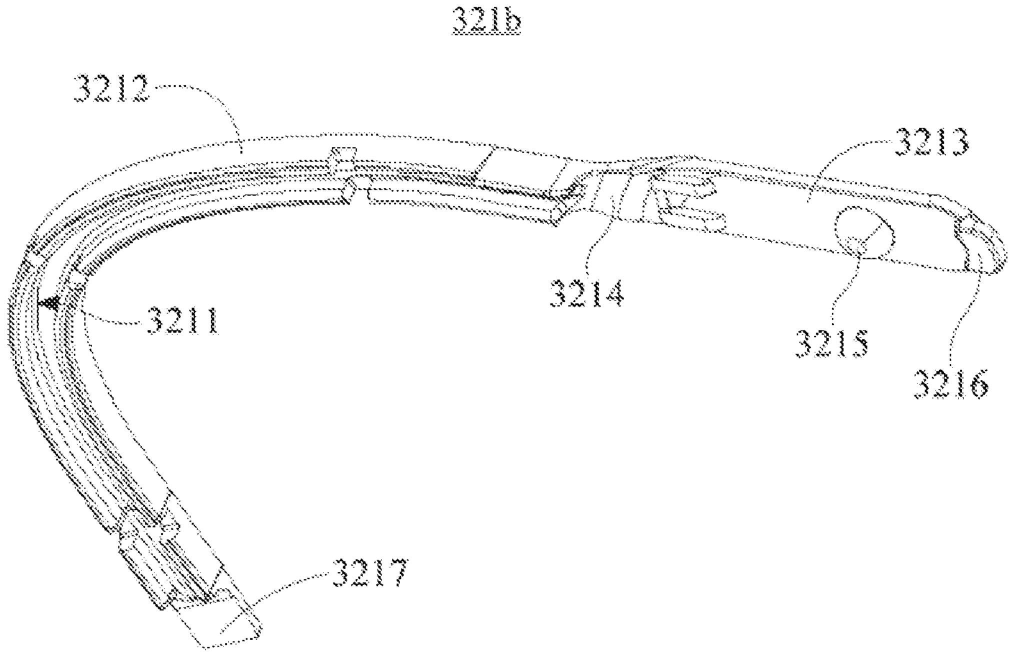
FIG. 7 is a structure diagram illustrating an exemplary decorative bracket in FIG. 5 according to some embodiments of the present disclosure.

FIG. 3 is a structure diagram illustrating disassembled structures of the ear hanger assembly in FIG. 2 according to some embodiments of the present disclosure; FIG. 4 is a structure diagram illustrating an exemplary shell of the ear hanger assembly in FIG. 3 according to some embodiments of the present disclosure; FIG. 5 is another structure diagram illustrating disassembled structures of the ear hanger assembly in FIG. 2 according to some embodiments of the present disclosure; FIG. 6 is a structure diagram illustrating an exemplary shell of the ear hanger assembly in FIG. 5 according to some embodiments of the present disclosure; FIG. 7 is a structure diagram illustrating an exemplary decorative bracket in FIG. 5 according to some embodiments of the present disclosure; FIG. 8 is a schematic diagram illustrating an exemplary process of decorative bracket triggering a key in FIG. 5 according to some embodiments of the present disclosure.

As shown in FIG. 3 and FIG. 5, the ear hanger assembly (e.g., the ear hanger assembly 30*a* and the ear hanger assembly 30*b*) may include a shell of the ear hanger assembly (a shell of the ear hanger assembly 31*a* and a shell of the ear hanger assembly 31*b*). The ear hanger assembly 30*a* and the ear hanger assembly 30*b* may be the hang assemblies on different sides (the right and the left). In some embodiments, the structure of the ear hanger assembly 30*a* and the structure of the ear hanger assembly 30*b* may be mirror-symmetrical structures. The interaction assembly may be arranged on the ear hanger assembly. In some embodiments, the interaction assembly may include a decorative member (also referred to as a first portion) and a key (also referred to as a second portion). The function corresponding to the key may be realized by triggering the key via pressing the decorative member. In some embodiments, the decorative member may include a decorative member 32*a* and a decorative member 32*b* respectively arranged on the two hang assemblies (i.e., the ear hanger assembly 30*a* and the ear hanger assembly 30*b*). The decorative member and the shell of the ear hanger assembly may be connected by a connection manner such as gluing, snap connection, screw connection, etc., or a combination thereof. In some embodiments, the decorative member may include a decorative member (e.g., a decorative member 30*a* and a decorative member 30*b*) arranged on one (e.g., the ear hanger assembly 30*a* and the ear hanger assembly 30*b*) of the two ear hanger assemblies (i.e., the ear hanger assembly 30*a* and the ear hanger assembly 30*b*) and a key. In some embodiments, when the acoustic device 200 is in the wearing state, the decorative member may be located on a side of the shell of the ear hanger assembly away from the user's head, i.e., on the outside of the acoustic device 200, to facilitate the decorative member to decorate the shell of the ear hanger assembly, thereby increasing an aesthetic appearance of the acoustic device 200. In some embodiments, the decorative member may protrude from the shell of the ear hanger assembly or be embedded in the shell of the ear hanger assembly. In some embodiments, the decorative member may include a sticker, a plastic member, a metal member, or the like. In some embodiments, the side of the decorative member away from the shell of the ear hanger assembly may be printed with a geometric pattern, a cartoon pattern, a logo pattern, or a coating fluorescent material, a reflective material, or the like, to realize the corresponding decorative effect.

As shown FIG. 3-FIG. 6, the shell of the ear hanger assembly may include the fixing portion (e.g., a fixing portion 311*a*, a fixing portion 311B, which may also be referred to as the third portion), a transition portion (e.g., a transition portion 312A, a transition portion 312*b*, which may also be referred to as the second portion), and an accommodation portion (e.g., an accommodation portion 313A, an accommodation portion 313*b*, which may also be referred to as the first portion), which may be connected in sequence. In some embodiments, the fixing portion may be configured to support the core module 210, and the cooperation relationship between the fixing portion and the core module 210 may be described in the present disclosure, such as the detail description of FIG. 9. The accommodation portion may include a space for accommodating other components or elements of the acoustic device 200, for example, some elements in the control circuit assembly (for example, the main control circuit board 50), at least part elements of the battery assembly (e.g., the battery 60), a microphone (a sound input assembly), or the like. The transition portion may be connected with the accommodation portion and the fixing portion. In some embodiments, the transition portion may be arranged in a bending shape to be hung on the outside of the human ear. In some embodiments, the transition portion may have a certain elasticity, and the shape of the transition portion may be adapted to the shape of the human auricle. The end of the accommodation portion away from the fixing portion may be connected with the rear hanger assembly 40 through a connection manner such as gluing, clamping, threaded connection, etc., or a combination thereof, to facilitate the assembly between the ear hanger assembly and the rear hanger assembly 40. In some embodiments, an end of the accommodation portion may be provided with an opening for placing at least some elements (the main control circuit board 50 and the battery 60) in the control circuit assembly and/or the battery assembly. In some embodiments, the shell of the ear hanger assembly may include a seal component 314, which may be arranged on an open end of the accommodation portion so that the accommodation portion may have a good seal.

In some embodiments, the accommodation portion 313*a* is shown in FIG. 3 may be configured to accommodate the main control circuit board 50, and the accommodation portion 313*b* shown in FIG. 5 may be configured to accommodate the battery 60. If the ear hanger assembly 30*a* shown in FIG. 3 corresponds to the left ear hanger assembly of the acoustic device 200, the ear hanger assembly 30*b* shown in FIG. 5 may correspond to the right ear hanger assembly of the acoustic device 200; conversely, if the ear hanger assembly 30*a* shown in FIG. 3 corresponds to the right ear hanger assembly of the acoustic device 200, the ear hanger assembly 30*b* shown in FIG. 5 may correspond to the left ear hanger assembly of the acoustic device 200. In other words, the main control circuit board 50 and the battery 60 may be arranged in the two hang assemblies, respectively. With this arrangement, not only the capacity of the battery 60 may be increased, but also the endurance of the acoustic device 200 may be improved; the weight of the acoustic device 200 may also be balanced to improve the wearing comfort of the acoustic device 200. In some embodiments, the main control circuit board 50 and the battery 60 may be connected through a wire built into the rear hanger assembly 40, the specific structure may be described in the present disclosure, such as the detailed description of FIG. 14.

In some embodiments, when the accommodation portion is configured to accommodate the main control circuit board 50 of the control circuit assembly, as shown in FIG. 3, the key may be set on the ear hanger assembly 30*a*, and the key may include a control key 33 and an interface 34 (e.g., a type-C (USB) interface). In some embodiments, the control key 33 and/or the interface 34 (e.g., the type-C (USB) interface) may be provided on the accommodation portion 313*a* to facilitate the connection with the main control circuit board 50, thereby shortening the distance of the wire. In some embodiments, the control key 33 and/or the interface 34 (e.g., the type-C (USB) interface) may be partially exposed outside the shell of the ear hanger assembly 31*a* to facilitate corresponding operations by the user. With this arrangement, the control key 33 may be configured to realize the functions of opening and closing the acoustic device 200, adjusting the volume, etc., and the interface 34 may be configured to realize the functions of data transmission, charging, etc. In some embodiments, the ear hanger assembly 30*a* may include an indicator light 35. In some embodiments, the indicator light 35 may be arranged on the accommodation portion 313*a* to be connected with the main control circuit board 50, thereby shortening the distance of the wire. In some embodiments, as shown in FIG. 3, the indicator light 35 may be partially exposed outside the shell of the ear hanger assembly 31*a*. In some embodiments, the indicator light 35 may include an LED light source provided in the shell of the ear hanger assembly 31*a* and a light guide member partially exposed outside the shell of the ear hanger assembly 31*a* (not shown in FIGS. 3 and 4). With this arrangement, the indicator light 35 may provide a prompt when the acoustic device 200 is charged, the power may be insufficient, or the ambient brightness may be low, etc.

It should be noted that when the acoustic device 200 is in the wearing state, the acoustic device 200 may be hung on an outside of the human ear (i.e., a back side). Specifically, the core module 210 may be generally located in a front of the human ear, and the main control circuit board 50 or battery 60 may be generally located in a rear of the human ear. At this time, the human ear may act as a fulcrum to support the acoustic device 200, causing the human ear to bear most of the weight of the acoustic device 200. The user may feel uncomfortable after wearing the acoustic device 200 for a long time. Therefore, the shell of the ear hanger assembly (especially the transition portion) may be made of a soft material to improve the wearing comfort of the acoustic device 200. In some embodiments, the material of the shell of the ear hanger assembly may be, but is not limited to, polycarbonate (PC), polyamides (PA), acrylonitrile butadiene styrene (ABS), polystyrene (PS), highImpactpolystyrene (HIPS), polypropylene (PP), polyethylene terephthalate (PET), polyvinyl chloride (PVC), polyurethanes (PU), polyethylene (PE), phenolformaldehyde (PF), urea formaldehyde (UF), melamine formaldehyde (MF), silica gel, etc. Further, due to the soft texture of the shell of the ear hanger assembly 31, the shell of the ear hanger assembly 31 may have a risk of insufficient stiffness, which may make it difficult to maintain the structure under the action of the external pressure, or even fracture due to insufficient strength. For this reason, the shell of the ear hanger assembly may be built with an elastic member (not shown in FIG. 4) with certain strength (at least in the transition portion), and the elastic member may include a metal wire, a fiber wire, a rubber wire, etc., to improve the strength of the shell of the ear hanger assembly and further increase the reliability of the shell of the ear hanger assembly. The material of the elastic metal wire may include, but is not limited to, spring steel, titanium alloy, titanium nickel alloy, chromium molybdenum steel, etc. In some embodiments, the shell of the ear hanger assembly may be obtained by injection molding of an elastic insert. When making the shell of the ear hanger assembly, an auxiliary metal wire may be used, and the auxiliary metal wire and the elastic member may be arranged side by side. In some embodiments, the auxiliary metal wire and the elastic member may have substantially the same structural parameters such as shape, length, radius of curvature, etc. An elastic coating may be formed on the surface of the auxiliary metal wire and the elastic member by injection molding, and then the auxiliary metal wire may be pulled out to obtain the elastic member.

In some embodiments, the core module 210 may be arranged at an end of the ear hanger assembly (i.e., an end where the fixing portion is located), the main control circuit board 50 or the battery assembly may be arranged at another end of the ear hanger assembly (i.e., another end where the accommodation portion is located). When the core module 210 is connected with the control circuit assembly (e.g., the main control circuit board 50) and the battery assembly (e.g., the battery 60 in FIG. 5) through the wire, the wire may at least pass through a region where the transition portion is located. In some embodiments, for the aesthetic appearance of the acoustic device 200, the wire may not be exposed outside the shell of the ear hanger assembly but may be threaded inside the shell of the ear hanger assembly so that at least the transition portion may cover the wire. However, since the texture of the wire is generally soft, it may be difficult to pass the wire in the shell of the ear hanger assembly. To this end, in some embodiments, the shell of the ear hanger assembly may be provided with a first groove (e.g., a first groove 315*a*, a first groove 315*b*). The decorative member (e.g., the decorative member 32*a* and the decorative member 32*b*) may be provided with a second groove on the side facing the first groove, so that when the decorative member may be embedded and fixed in the first groove, and the second groove and the first groove may cooperate with each other to provide a wire channel. As shown in FIG. 3 and FIG. 5, the decorative member may include a bracket (e.g., a bracket 321*a*, a bracket 321*b*) and an auxiliary member (e.g., an auxiliary member 322*a*, an auxiliary member 322*b*). The bracket and the transition portion may be correspondingly arranged in a bending shape, so that when the bracket is embedded and fixed in the first groove corresponding to the transition portion, the bracket and the first groove on the transition portion may cooperate to provide the wire channel to allow the wire to extend from the core module 210 to the accommodation portion through the wire channel. In some embodiments, the auxiliary member may be embedded in the first groove and fixed with the bracket. In some embodiments, the bracket may be a plastic member, a fiber member, or a metal member, and may be assembled with the shell of the ear hanger assembly by bonding and/or clipping. In some embodiments, the auxiliary member may include a sticker and may be attached to the bracket by bonding. With this arrangement, when the user wants to change the decorative effect of the decorative member, the user may replace the auxiliary member without removing the decorative member from the shell of the ear hanger assembly as a whole.

In some embodiments, as shown in FIG. 4, the shell of the ear hanger assembly 31*a* may be provided with a first groove 315*a* opened on the transition portion 312*a*, the fixing portion 311*a*, and the accommodation portion 313*a*. The first groove 315*a* may include a first segment 3151*a* located on the transition portion 312*a* (also referred to as the second portion), a second segment 3152*a* located on the fixing portion 311*a* (also referred to as the third portion), and a third segment 3153*a* located on the accommodation portion 313*a* (also referred to as the first portion). The depth of the first segment 3151*a* may be greater than the depth of the second segment 3152*a* and the third segment 3153*a*, so that the first segment 3151*a* may be configured to accommodate the bracket 321*a* and realize wiring, while the second segment 3152*a* and the third segment 3153*a* may be mainly configured to accommodate the auxiliary member 322*a*. In addition to being located in the first segment 3151*a*, the auxiliary member 322*a* may further extend into the second segment 3152*a* and the third segment 3153*a*. In some embodiments, a pit 316*a* may be provided in the third segment 3153*a*. Further, the depth of the second segment 3152*a* may be equal to the depth of the third segment 3153*a*. After the bracket 321*a* is embedded and fixed to the first segment 3151*a*, a side of the bracket 321*a* away from the first segment 3151*a* (the side on which the auxiliary member 322*a* is installed) may be substantially flush with a groove bottom of the second segment 3152*a* and the third segment 3153*a*. When the auxiliary member is installed on the side of the bracket away from the first segment 3151*a* and in the second segment 3152*a* and the third segment 3153*a*, the auxiliary member 322*a* may be flatly attached to the fixing portion 311*a*, the bracket 321*a*, and the accommodation portion 313*a*.

Further, the bonding strength (or the adhesive strength) between the auxiliary member 322*a* and the bracket 321*a* may be less than the fixing strength between the bracket 321*a* and the transition portion 312*a*. In some embodiments, the bonding strength (or the adhesive strength) may be denoted by a minimum load applied to a bonding portion (e.g., a bonding portion between the auxiliary member 322*a* and the bracket 321*a*) to break or separate the bonding portion. In some embodiments, the fixing strength may be denoted by the minimum load applied to a connecting portion (e.g., a connecting portion between the bracket 321*a* and the transition portion 312*a*) to break or separate the connecting portion. In some embodiments, the type of the load may include a tensile strength, a flexural strength, and a shear strength. When the auxiliary member 322 is bonded with the bracket 321*a*, the bonding strength may refer to the bonding strength between the auxiliary member 322 and the bracket 321*a*. The size of the bonding strength may mainly depend on the roughness of the surface on which the bracket 321*a* and the auxiliary member 322*a* are bonded and/or the amount (and/or viscosity) of colloid between the auxiliary member 322*a* and the bracket 321*a*. Further, when the bracket 321*a* is clamped with the transition portion 312*a*, the fixing strength may refer to the clamping strength between the bracket 321*a* and the transition portion 312*a*. The fixing strength may mainly depend on a fit clearance between the bracket 321*a* and the transition portion 312*a*; and/or the depth of the two clips. With this arrangement, when the bracket 321*a* and the shell of the ear hanger assembly 31*a* are assembled in a clamping manner, both ends of the auxiliary member 322*a* may be glued with the accommodation portion 313*a* and the fixing portion 311*a* respectively, which may further fix the bracket 321*a*, and when the auxiliary member 322*a* is replaced to change the decorative effect of the decorative member 32*a*, the bracket 321A may not be separated from the transition portion 312*a* because of the excessive bonding strength between the bracket 321*a* and the auxiliary member 322*a*.

In some embodiments, as shown in FIG. 5, at least the transition portion 312*b* of the shell of the ear hanger assembly 31*b* may be provided with a first groove 315*b*, which may be used for wiring to reduce the difficulty of threading wires in the shell of the ear hanger assembly 31*b*. The first groove 315*b* may be specifically arranged on a side of the shell of the ear hanger assembly 31*b* close to the decorative member 32*b*. At this time, the decorative member 32*b* may be partially embedded and fixed in the first groove 315*b* corresponding to the transition portion 312*b* to provide a wire channel between the shell corresponding to the decorative member 32*b* and the transition portion 312*b* or between the decorative member 32*b* and the first groove 315*b* (not shown in FIG. 3 and FIG. 5). Further, a wire may be allowed to extend from the core module 210 to the accommodation portion 313*b* through the wire channel, so that the wire may realize the connection between the core module 210, the main control circuit board 50, and the battery assembly 60. With this arrangement, when the wire is threaded through the first groove 315*b* on the shell of the ear hanger assembly 31*b*, the decorative member 32*b* may cover the wire to avoid the wire being exposed outside the shell of the ear hanger assembly. At this time, the decorative member 32*b* may not only decorate the shell of the ear hanger assembly 31*b* but also shield the wire, so that the decorative member 32*b* may achieve "one piece with two functions."

In some embodiments, as shown in FIG. 5, the shell of the ear hanger assembly 30*b* may be provided with a key 36, and a key adaption hole 317 may be further opened with the shell of the ear hanger assembly 31*b*. The bracket 321*b* may be assembled and fixed on the outer wall of a side of the shell of the ear hanger assembly 31, and the key 36 may be arranged on the inner wall of one side of the bracket 321*b* of the shell of the ear hanger assembly 31*b* and may be exposed through the key adaption hole 317; the bracket 321*b* may further extend in a cantilever form above the key 36 exposed through the key adaption hole 317 and may trigger the key 36 when pressed by the external pressure. With this arrangement, the functions of opening and closing the acoustic device 200 and adjusting the volume may be realized by pressing the key 36 without setting the control key 33. In some embodiments, the key 36 and the control key 33 may also be set at the same time, the control key 33 may be configured to realize the functions such as opening and closing of the acoustic device 200, and the volume adjustment, and the key 36 may be configured to realize the functions such as play/pause, AI voice wake-up (from a sleeping state to a running state after detecting a set voice command) to expand the interaction ability of the acoustic device 200.

In some embodiments, the key adaption hole 317 may be opened at the fixing portion 311*b*, and the user may press the key 36 at the fixing portion. At this time, the ear hanger assembly may further include a seal component 37, and the seal component 37 may be disposed between the key 36 and the fixing portion and may cover the key adaption hole 317 from the inner side of the fixing portion. The material of the seal component 37 may include but is not limited to, silicone, rubber, or the like. With this arrangement, it may not only increase the waterproof performance of the fixing portion in a region where the key 36 is located but also improve the pressing touch feeling of the key 36.

In some embodiments, when the core module 210 may be arranged at an end of the ear hanger assembly (i.e., the end where the fixing part is located) and the battery assembly 60 is arranged at another end of the ear hanger assembly (i.e., the end where the accommodation portion is located), the wire may at least pass through the region where the transition portion is located, so that the core module 210 may be connected with the battery assembly 60 through the wire. In this way, as shown in FIG. 5, the shell of the ear hanger assembly 31*b* may be provided with a first groove 315*b* at least on a side of the fixing portion 311*b* and the transition portion 312*b* close to the bracket 321*b*, the first groove 315*b* may be used for wiring to reduce the difficulty of threading wires in the shell of the ear hanger assembly 31*b*. Further, an end of the first groove 315*b* may be communicated with the key adaption hole 317, so that when the bracket 321*b* may be embedded and fixed in the first groove 315*b*, the bracket 321*b* may also cover the key adaption hole 317 to trigger the key 36. In the above way, the decorative member may not only decorate the shell of the ear hanger assembly and mask the wire, but also mask and trigger the key 36, so that the decorative member may realize "one piece with four functions."

In some embodiments, as shown in FIG. 6, the first groove 315*b* may include a first segment 3151*b* arranged on the transition portion 312*b* and a second segment 3152*b* arranged on the fixing portion 311*b*. The depth of the first segment 3151*b* may be greater than the depth of the segment 3152*b*, so that the first segment 3151*b* may be configured to realize wiring, and the second segment 3152*b* together with the first segment 3151*b* may be configured to accommodate the bracket. The key adaption hole 317 may be provided on the second segment 3152*b*, i.e., the projections of the key adaption hole 317 and the second segment 3152*b* on the fixing portion 311*b* may at least partially coincide. Further, the first groove 315*b* may also include a third segment 3153*b* located on the accommodation portion 313*b*, and the third segment 3153*b* may also be provided with a pit 316*b*. The depth of the second segment 3152*b* may be greater than the depth of the third segment 3153*b*, so that the third segment 3153*b* may be mainly configured to accommodate the auxiliary member 322*b*. That is, the auxiliary member 322*b* may be further extended into the third segment 3153*b* in addition to being located in the first segment 3151*b* and the second segment 3152*b*. At this time, after the bracket is embedded and fixed to the first segment 3151*b*, the side of the bracket away from the shell of the ear hanger assembly 31*b* may be roughly flush with the groove bottom of the third segment 3153*b*, so that the auxiliary member may be flat attached to the fixing portion 311B, the bracket, and the accommodation portion 313*b*; and the bracket may form a cantilever at the key adaption hole 317 corresponding to the second segment 3152*b*.

In some embodiments, as shown in FIG. 7, the bracket 321*b* may be provided with a second groove 3211 on the side facing the first groove 315*b*, so that when the bracket 321*b* may be embedded and fixed in the first groove 315*b*, the second groove 3211 and the first groove 315*b* may cooperate with each other to provide a wire channel. Accordingly, a second groove (not shown in FIG. 3) which is mirror symmetrical with the second groove 3211 may be provided in the bracket 321*a*.

It should be noted that the bracket and the auxiliary member may also be an integral structural part. The material of the bracket and the material of the auxiliary member may be different, and the bracket and the auxiliary member may be two-color injection molding, so that the bracket may play a support role, and the auxiliary member may play a decorative role. In some embodiments, the overall length of the auxiliary member may be greater than or equal to the overall length of the bracket.

In some embodiments, as shown in FIG. 4 and FIG. 6, the bottom of the first groove may be provided with one or more pits (e.g., a pit 316*a* and a pit 316*b*) near the end of the auxiliary member to allow the user to press the auxiliary member into the pits and make the end of the auxiliary member tilt up from the first groove to facilitate the replacement of the auxiliary member.

In some embodiments, the first groove may be further extended to the accommodation portion, and the one or more pits may be arranged on the accommodation portion. The one or more pits may be located outside a region of the first groove covered by the bracket, and the auxiliary member may be fitted and fixed on the bracket and may cover the one or more pits. In some embodiments, the overall length of the auxiliary member may be greater than the overall length of the bracket. The bracket may cover the first segment and the second segment, and the auxiliary member may cover the bracket and extend to the third segment to make the appearance of the connection region of the bracket on the ear hanger assembly more beautiful. Since the structures of the ear hanger assembly 30*a* and the ear hanger assembly 30*b* may be mirror-symmetrical, the structures of the first groove 315*b*, the auxiliary member 322*b*, and the bracket 321*b*, and the structures of the first groove 315*a*, the auxiliary member 322*a*, and the bracket 321*a* may be also mirror-symmetrical to each other. More information may refer to the relevant description of the symmetrical structure.

In some embodiments, as shown in FIGS. 7 and 8, the bracket 321*b* may include an fixing portion 3212 corresponding to the first segment 3151*b* and a pressing portion 3213 corresponding to the second segment 3152*b*. The thickness of the fixing portion 3212 may be greater than the thickness of the pressing portion 3213, so that the fixing portion 3212 may be configured to realize the assembly between the bracket 321*b* and the shell of the ear hanger assembly 31*b*, and the pressing portion 3213 may be configured to trigger the key 36. Further, when the bracket 321*b* is provided with a second groove 3211 on the side facing the shell of the ear hanger assembly 31*b*, the second groove 3211 may be arranged on the fixing portion 3212.

As shown in FIGS. 7 and 8, the bracket 321*b* may include a connecting portion 3214 (i.e., a first connecting portion) between the fixing portion 3212 and the pressing portion 3213. In some embodiments, the connecting portion 3214 may be bent and extended to the side away from the shell of the ear hanger assembly 31*b* compared with the fixing portion 3212, and the pressing portion 3213 may be bent and extended to the side close to the shell of the ear hanger assembly 31*b* compared with the connecting portion 3214. At this time, the connecting portion 3214 may make the pressing portion 3213 suspended relative to the fixing portion 3212, i.e., when the pressing portion 3213 is not in the pressed state, the pressing portion 3213 may be not in contact with the shell of the ear hanger assembly 31*b*, and a vertical distance between the pressing portion 3213 and the shell of the ear hanger assembly 31*b* fixing portion and a vertical distance between the fixing portion 3212 and the shell of the ear hanger assembly 31*b* may be not equal and with a certain difference (e.g., D1 in FIG. 8). The difference may be greater than or equal to a trigger path distance of the key 36. The trigger path distance may be a distance that the pressing portion 3213 may move towards the key 36 and trigger the key 36 (e.g., D2 in FIG. 8). With this arrangement, a problem that another end of the bracket 321*b* may be tilted when the user presses an end of the bracket 321*b* (i.e., the pressing portion 3213) may be effectively improved.

In some embodiments, the side of the pressing portion 3213 close to the shell of the ear hanger assembly may be provided with a key protrusion 3215, so that when the pressing portion 3213 is pressed by an external pressure, the key protrusion 3215 may trigger the key 36. The projection of the key protrusion 3215 and the projection of the key 36 on the fixing portion along the surface of the shell of the ear hanger assembly 31 may at least partially coincide. When the pressing portion 3213 moves towards the key 36 and contacts the key 36 under pressure, the effective area of the key protrusion 3215 in contact with the key 36 (e.g., s in FIG. 8) may be smaller than the effective area of the pressing portion 3213 in direct contact with the key 36 when the key protrusion is not set. With this arrangement, the trigger difficulty of the key 36 may be reduced; in particular, when the seal component 37 is provided between the key 36 and the fixing portion, the seal component 37 needs to be deformed first because the key 36 is triggered. Based on the relational formula F a E S, when an external pressure F applied by the user is the same, the smaller the effective area S of the region where the seal component 37 needs to be deformed, the larger a deformation E produced by the seal component 37, and the easier the trigger of the key 36. Obviously, compared with the pressing portion 3213, the key protrusion 3215 may reduce the above-mentioned effective area, so that the deformation E generated by the sealing assembly 37 may be larger.

In some embodiments, a stopping portion 3216 (i.e., a third connection portion) may be provided at an end of the bracket close to the fixing portion (i.e., an end of the pressing portion 3213 away from the fixing portion 3212). As shown in FIG. 8, the thickness of the stopping portion 3216 in the direction perpendicular to the key 36 may be less than the thickness of the pressing portion 3213. When the pressing portion 3213 is installed in the second segment, the stopping portion 3216 may be configured to provide a block with a snap groove 3154 of the second segment in the direction perpendicular to the surface of the shell of the ear hanger assembly 31 to prevent an end of the pressing portion away from an end of the fixing portion 3212 (i.e., an end close to the stopping portion 3216) and on the bracket from being tilted from the first groove, especially under the external pressure. In some embodiments, the snap groove 3154 may include a horizontal part on the top and a vertical wall on the right as shown in FIG. 8. In some embodiments, the snap groove 3154 may not include a horizontal part on the top and include a vertical wall on the right. As shown in FIG. 8, the stopping portion 3216 may be specifically provided at an end of the pressing portion 3213 away from the fixing portion 3212. At this time, due to the stopping action between the stopping portion 3216 and the fixing portion 3213, the bracket may not be tilted due to excessive elastic recovery after the key 36 is triggered due to the deformation of the bracket under the external pressure.

In some embodiments, referring to FIG. 3 or FIG. 7, an end of the bracket close to the accommodation portion (i.e., an end away from the pressing portion 3213) may be provided with an overlapping joint portion 3217 (i.e., a second connecting portion). In some embodiments, the thickness of the overlapping joint portion 3217 may be less than the thickness of the fixing portion 3212 to avoid the structural overlap with the reinforcing structure of the shell of the ear hanger assembly (specifically between the transition portion and the accommodation portion).

Figure 9:
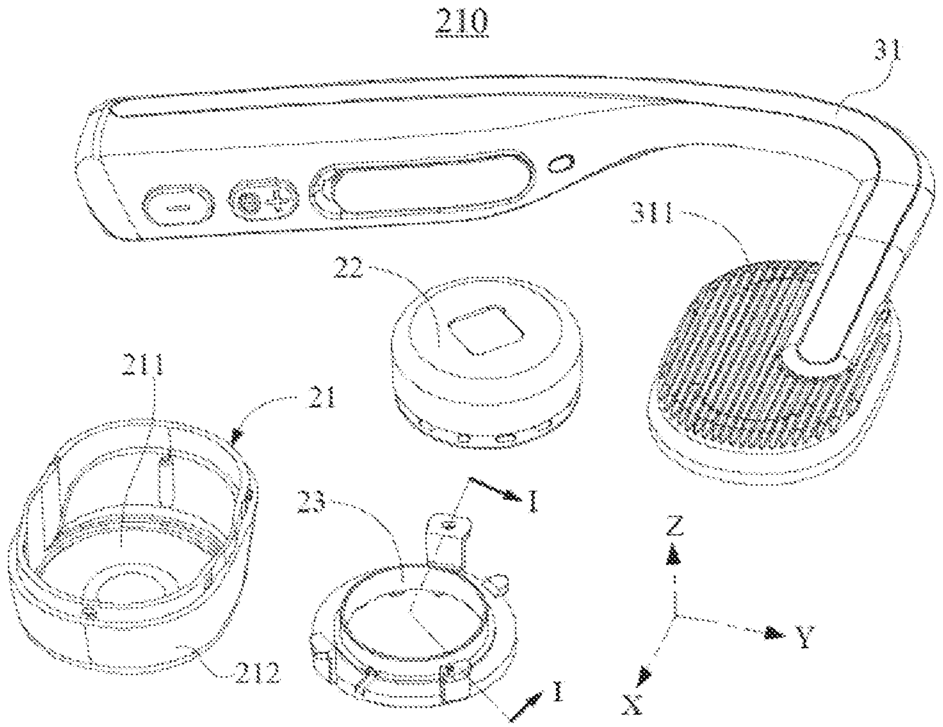
FIG. 9 is a structure diagram illustrating disassembled structures of an exemplary core module in FIG. 2 according to some embodiments of the present disclosure.

FIG. 9 is a structure diagram illustrating disassembled structures of an exemplary core module in FIG. 2 according to some embodiments of the present disclosure.

As shown in FIG. 9, the core module 210 may include a core shell 21 and a core 22. In some embodiments, an end of the core shell 21 may be open, and the shell of the ear hanger assembly 31 (specifically, the fixing portion 311) may be covered on an open end of the core shell 21 to provide a cavity structure (i.e., a space) for accommodating the core 22. At this time, the shell of the ear hanger assembly 31 may be equivalent to a cover of the core shell 21. With this arrangement, compared with the plug-in assembly manner of the hang structure and the core structure, a covering assembly manner of the shell of the ear hanger assembly 31 and the core shell 21 in the embodiment of the present disclosure may improve the stress problem of the hang structure and the core structure at the plug-in point, and further increase the reliability of the acoustic device 200.

It should be noted that the shell of the ear hanger assembly 31 shown in FIG. 9, may be mainly for the convenience of describing the relative position relationship between the shell of the ear hanger assembly 31 and the core shell 21, and may show a possible assembly manner between the shell of the ear hanger assembly 31 and the core shell 21.

In some embodiments, the core 22 may be directly or indirectly fixed in the core shell 21, so that the core 22 may vibrate under the excitation of an electrical signal, and the core shell 21 may vibrate with the core 22 together. When the user wears the acoustic device 200, a skin contacted region of the core shell 21 (i.e., a bottom wall 211 described later) may be in contact with the user's skin, so that the above vibration may be transmitted to an auditory nerve through the human skull, so that the user may hear the sound played by the acoustic device 200. In some embodiments, the core module 210 may include a core bracket 23 for securing the core 22 in the core shell 21.

In some embodiments, the core module 210 may include a bone conduction speaker assembly. A frequency response curve in the frequency range 500-6000 Hz may be particularly critical for a bone conduction earphone. In this frequency range, sharp peaks and valleys may be not expected; the flatter the frequency response curve is, the better the sound quality of the bone conduction headphone may be.

Figure 10:
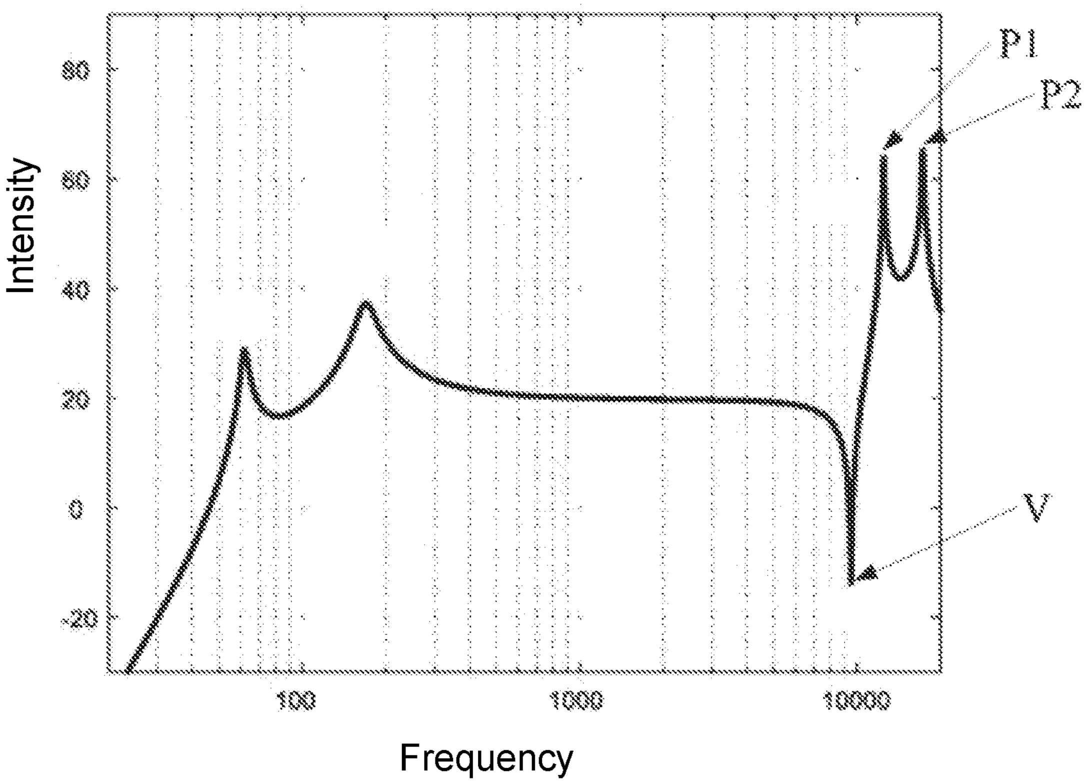
FIG. 10 is a schematic diagram illustrating a frequency response curve of an exemplary bone conduction headphone according to some embodiments of the present disclosure.

FIG. 10 is a schematic diagram illustrating a frequency response curve of an exemplary bone conduction headphone according to some embodiments of the present disclosure. As shown in FIG. 10, a horizontal axis denotes a vibration frequency (Unit: Hz), and a vertical axis denotes a vibration intensity (Unit: dB); a low frequency may refer to a frequency less than 500 Hz, a medium frequency may refer to a frequency in a frequency range of 500-4000 hz, and a high frequency may refer to a frequency greater than 4000 Hz. The high frequency region of the frequency response curve (the range with frequency greater than 4000 Hz) has a first high frequency valley V, a first high frequency peak P1, and a second high frequency peak P2. The first high frequency valley V and the first high frequency peak P1 may be generated by deformation of a non-skin contacted region of the core shell 21 (i.e., an annular peripheral wall 212 described later) under the high frequency, and the second high frequency peak P2 may be generated by the deformation of a skin contacted region (i.e., a bottom wall 211) of the core shell 21 under the high frequency. Generally, the greater the stiffness of a structure is, the smaller the deformation of the structure when it is stressed is, which may be also conducive to a higher frequency resonance. Therefore, in some embodiments, the first high frequency valley V, the first high frequency peak P1, and the second high frequency peak P2 may be moved to a higher frequency region by increasing the stiffness of the core shell 21. In other words, in order to obtain better sound quality, the stiffness of the core shell 21 may be as large as possible. To this end, in some embodiments, the material of the core shell 21 may include a mixture of polycarbonate, polyamide, acrylonitrile butadiene styrene copolymer with glass fiber or carbon fiber. In some embodiments, the material of the core shell 21 may be a mixture of carbon fiber and polycarbonate mixed in a certain proportion, or glass fiber and polycarbonate mixed in a certain proportion, or glass fiber and polyamide mixed in a certain proportion. In other embodiments, the material of the core shell 21 may be carbon fiber, glass fiber, and polycarbonate mixed in a certain proportion. Adding different proportions of carbon fiber and/or glass fiber, the elastic modulus of the material may be different, and the stiffness of the core shell 21 may be also different. For example, by adding 20%-50% glass fiber to polycarbonate, the elastic modulus of the material may reach 6-8 GPa.

Based on the above detailed description, on the one hand, the shell of the ear hanger assembly 31 (especially the fixing portion 311) may be used as a part of the structure of the core module 210 to provide a cavity structure for accommodating the core 22; on the other hand, in some embodiments, in order to improve the wearing comfort of the acoustic device 200, the shell of the ear hanger assembly 31 may be generally made of a softer material, so that the stiffness of the shell of the ear hanger assembly 31 may be smaller. With this arrangement, when the shell of the ear hanger assembly 31 is covered on the core shell 21 to provide a cavity structure for accommodating the core 22, since the stiffness of the shell of the ear hanger assembly 31 (especially the fixing portion 311) may be less than the stiffness of the core shell 21, the bone conduction earphone may be prone to sound leakage, thereby affecting the user's good impression.

Generally, the resonance frequency of a structure may be related to the stiffness of the structure, i.e., under the same quality, the greater the stiffness of the structure is, the higher the resonance frequency may be. The stiffness K (specifically expressed as the elastic modulus) of the structure may be related to its material, specific structural form, and other factors. Generally, the greater elastic modulus E of the material is, the greater stiffness K of the structure may be; the greater thickness t of the structure is, the greater stiffness K of the structure may be. At this time, the above relationship can be described simply by the relational formula $K \propto (E \cdot t)/S$. Therefore, one or a combination of increasing the elastic modulus E of the material, increasing the thickness t of the structure, and reducing the area S of the structure may increase the stiffness K of the structure, thereby increasing the resonance frequency of the structure.

In some embodiments, the shell of the ear hanger assembly 31 may be made of a soft material (i.e., a material with a small elastic modulus, such as polycarbonate, polyamide, whose elastic modulus may be mostly 2-3 Gpa), for example, the elastic modulus may be less than 4 GPa, or less than 3.5 Gpa, or less than 3 GPa. The core shell 21 may be made of a hard material (i.e., a material with a large elastic modulus, for example, the elastic modulus may be greater than 5 Gpa, or greater than 5.5 Gpa, or greater than 6 Gpa, for example, 20%-50% glass fiber may be added to polycarbonate, and the elastic modulus of the material may reach 6-8 Gpa, etc.). Due to the difference in the elastic modulus, the stiffness of the shell of the ear hanger assembly 31 may be also inconsistent with the stiffness of the core shell 21, and the above leakage sound may be easy to occur. In addition, after the shell of the ear hanger assembly, 31 is connected with the core shell 21, the structure may be easy to generate resonance at a lower frequency due to the inconsistent stiffness of the shell of the ear hanger assembly 31 and the core shell 21.

Therefore, in some embodiments, when the elastic modulus of the core shell 21 is greater than the elastic modulus of the shell of the ear hanger assembly 31, the fixing portion 311 of the shell of the ear hanger assembly 31 may be provided with a reinforcing structure, so that the ratio of the difference between the stiffness K1 of the skin contacted region of the core shell 21 and the stiffness K2 of the fixing portion 311 to the stiffness K1 of the skin contacted area of the core shell 21 may be less than or equal to 10%. That is, $(K1-K2)/K1 \leq 10\%$, or $K2/K1 \geq 90\%$. With this arrangement, it may not only ensure that the core shell 21 has enough stiffness so that the resonance frequency of the core shell 21 may be located in a high frequency region as high as possible, but also reduce a stiffness difference between the fixing portion 311 and the core shell 21 to increase the resonance frequency of the structure and improve the above leakage.

Figure 11:
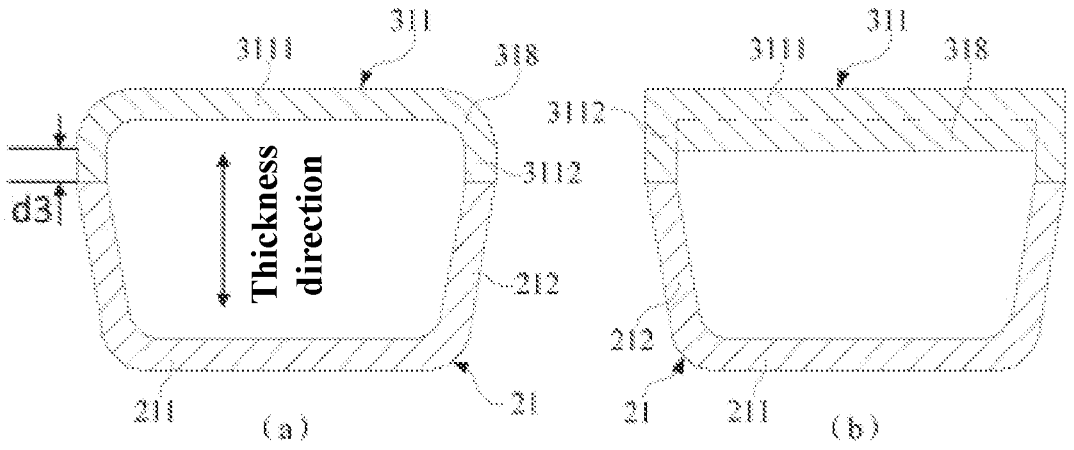
FIG. 11 is a schematic diagram illustrating a sectional structure of an exemplary reinforcing structure provided on a shell of the ear hanger assembly in FIG. 9 according to some embodiments of the present disclosure.

For example, FIG. 11 is a schematic diagram illustrating a sectional structure of an exemplary reinforcing structure provided on a shell of the ear hanger assembly in FIG. 9 according to some embodiments of the present disclosure. As shown in FIG. 11, the core shell 21 may include a bottom wall 211 and an annular wall 212. The bottom wall 211 may be the skin contacted region of the core shell 21, and an end of the annular wall 212 may be connected with the bottom wall 211. In other words, the bottom wall 211 may be configured to contact the skin of the user. The fixing portion 311 may include a fixing body 3111 connected with the transition portion 312 and an annular flange 3112. The annular flange 3112 may be connected with the fixing body 3111 and extend toward a direction perpendicular to the plane of the fixing body 3111 (i.e., the core shell 21), or a direction inclining to the plane of the fixing body 3111 at an angle. That is, an included angle between the annular flange 3112 and the fixing body 3111 may be 0-90 degrees. The annular flange 3112 and another end of the annular wall 212 away from the bottom wall 211 may be connected with each other, and the annular flange 3112 and the annular peripheral wall 212 may be connected by bonding or a combination of bonding and clamping.

Figure 12:
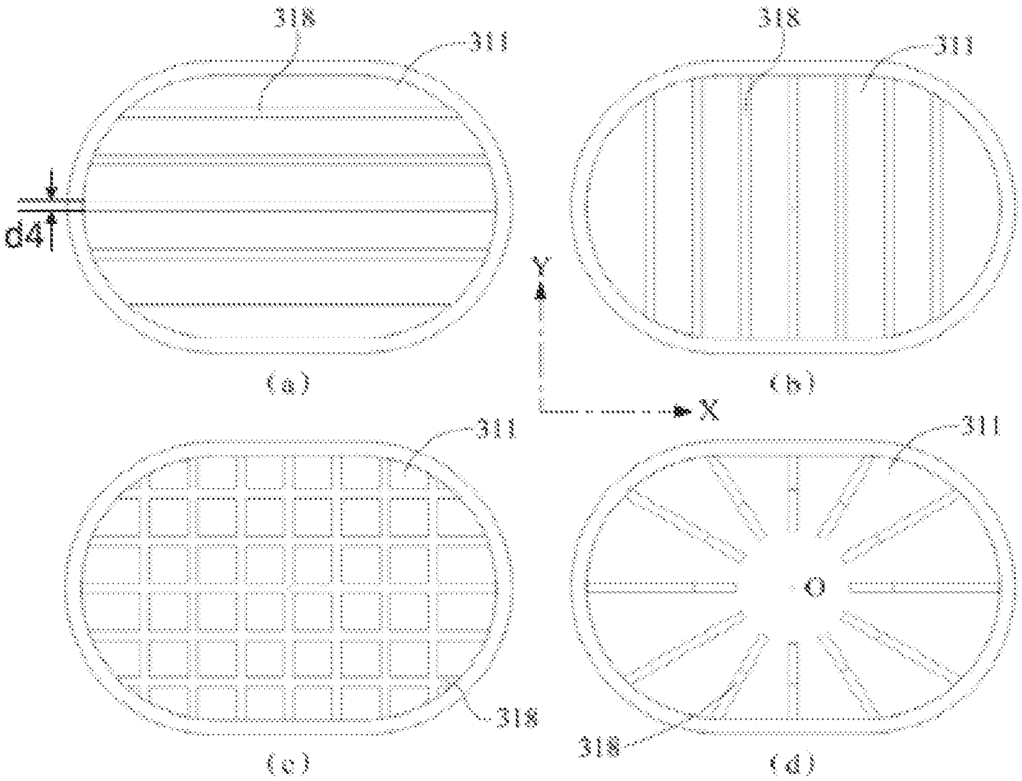
FIG. 12 is a schematic diagram illustrating a sectional structure of another exemplary reinforcing structure provided on a shell of the ear hanger assembly in FIG. 9 according to some embodiments of the present disclosure.

The bottom wall 211 may have any one of a rectangle, a square, a circle, an ellipse, an ellipse-like shape (similar to the shape of the fixing portion 311 shown in FIG. 12). In some embodiments, the annular wall 212 may be perpendicular to the bottom wall 211, i.e., the area of the opening end of the core shell 21 may be equal to the area of the bottom wall 211; in some embodiments, the annular peripheral wall 212 may also be inclined outward by an angle with respect to the bottom wall 211 (e.g., the inclination angle may be less than or equal to 30°), i.e., the area of the open end of the core shell 21 may be larger than the area of the bottom wall 211. In some embodiments, the bottom wall 211 may be oval-like and the annular wall 212 may be inclined outward by 10° with respect to the bottom wall 211. With this arrangement, on the premise of ensuring a certain degree of wearing comfort (because the bottom wall 211 serves as the skin contact area of the core shell 21 may contact with the user's skin, the area of the bottom wall 211 may be not too small), reducing the area of the bottom wall 211 may increase the resonance frequency of the core shell 21.

As shown in FIG. 11(*a*), the reinforcing structure 318 may be an arc structure arranged between the fixing body 3111 and the annular flange 3112, i.e., filleting the connection between the fixing body 3111 and the annular flange 3112. In some embodiments, the fixing body 3111, the reinforcing structure 318, and the annular flange 3112 may be an integral structural part. In some embodiments, the size of the annular flange 3112 in the thickness direction of the fixing portion 311 (e.g., d3 in FIG. 11(*a*)) may be set smaller. In some embodiments, the fixing portion 311 may include the fixing body 3111 and the reinforcing structure 318 that is the arc structure, i.e., the fixing portion 311 may be not provided with the annular flange 3112. With this arrangement, the above arc structure may reduce the effective area of the fixing portion 311, increase the stiffness of the fixing portion 311, and reduce a stiffness difference between the fixing portion 311 and the core shell 21. It should be noted that the size of the above arc structure may be reasonably designed according to the stiffness requirements of the fixing portion 311, and may be not limited here.

In some embodiments, as shown in FIG. 11(*b*), the reinforcing structure 318 may be a thickened layer integrally arranged with the fixing body 3111, i.e., the fixing body 3111 may be thickened. The material of the thickened layer may be the same as the material of the shell of the ear hanger assembly 31. For example, the material of the thickened layer may be any one of polycarbonate, polyamide, or acrylonitrile butadiene styrene copolymer. It should be noted that the reinforcing structure 318 may be located either on a side of the fixing body 3111 close to the core shell 21, or on another side of the fixing body 3111 away from the core shell 21, and it may also be located on both sides of the fixing body 3111. Further, since the size of the annular flange 3112 in the thickness direction of the fixing portion 311 is generally small, the annular flange 3112 may be integrated with the thickened layer. At this time, the structure of the fixing portion 311 may include the fixing body 3111 and the reinforcing structure 318 provided with a thickened layer.

With this arrangement, the thickened layer may increase the effective thickness of the fixing portion 311, increase the stiffness of the fixing portion 311, and reduce a stiffness difference between the fixing portion 311 and the core shell 21. It should be noted that the size of the thickened layer may be reasonably designed according to the stiffness requirements of the fixing portion 311 and is not limited here.

In some embodiments, the reinforcing structure 318 may be a metal product. The material of the metal product may include aluminum alloy, magnesium alloy, titanium alloy, nickel alloy, chromium molybdenum steel, stainless steel, etc. At this time, the reinforcing structure 318 and the fixing portion 311 may be an integral part made by outsert moulding injection molding. With this arrangement, the metal product may effectively increase the stiffness of the fixing portion 311, thereby reducing a stiffness difference between the fixing portion 311 and the core shell 21. It should be noted that the material, the size, and other parameters of the above metal product may be reasonably designed according to the stiffness requirements of the fixing portion 311, and are not limited here.

In some embodiments, the reinforcing structure 318 may be an accessory provided on the fixing portion 311. For example, FIG. 12 is a schematic diagram illustrating a sectional structure of another exemplary reinforcing structure provided on a shell of the ear hanger assembly in FIG. 9 according to some embodiments of the present disclosure. As shown in FIG. 12, the reinforcing structure 318 may be a stiffener provided on the fixing portion 311. In some embodiments, the stiffener may be distributed on the side of the fixing portion 311 close to the core shell 21. In some embodiments, the number of stiffeners may be multiple, and the plurality of stiffeners may be arranged side by side as shown in FIGS. 12(*a*) and 12(*b*) or in a grid as shown in FIG. 12(*c*); the plurality of stiffeners may also be radially arranged around a preset reference point on the fixing portion 311 as shown in FIG. 12(*d*). In some embodiments, the material of the stiffener may be the same as the material of the shell of the ear hanger assembly 31. For example, the material of the stiffener may be any one of polycarbonate, polyamide, and acrylonitrile butadiene styrene copolymer. With this arrangement, compared with the manner of injecting a metal part into the fixing portion 311 or directly thickening the fixing portion 311, setting a stiffener on the fixing portion 311 may not only increase the stiffness of the fixing portion 311 but also take into account the weight of the fixing portion 311, i.e., increase the weight of the fixing portion 311 as little as possible.

In some embodiments, as shown in FIG. 12, the fixing portion 311 may have a major axis direction (as shown by a dotted line X in FIG. 12) and a minor axis direction (as shown by a dotted line Yin FIG. 12). The size of the fixing portion 311 in the major axis direction may be larger than the size of the fixing portion 311 in the minor axis direction. The following may be an exemplary description of the distribution of stiffeners:

As shown in FIG. 12(*a*), the plurality of stiffeners may be arranged by extending along the major axis direction in a strip setting and arranged side by side along the minor axis direction. At this time, the reinforcing structure 318 may be regarded as reinforcement along a long side (i.e., long side reinforcement) of the fixing portion 311. In some embodiments, the distances between adjacent stiffeners may be the same. In some embodiments, the distances between adjacent stiffeners may be different.

As shown in FIG. 12(*b*), the plurality of stiffeners may be arranged by extending along the minor axis direction in a strip setting and arranged side by side along the minor axis direction. At this time, the reinforcing structure 318 may be regarded as reinforcement along a short side (i.e., short side reinforcement) of the fixing portion 311. In some embodiments, the distances between adjacent stiffeners may be the same. In some embodiments, the distances between adjacent stiffeners may be different.

As shown in FIG. 12(*c*), the plurality of stiffeners may be arranged along the long axis direction and the short axis direction respectively to form a grid shape. At this time, the reinforcing structure 318 may be regarded as reinforcement along the cross (cross reinforcement) of the fixing portion 311.

As shown in FIG. 12(*d*), the plurality of stiffeners may be arranged along the circumference of the fixing portion 311. The ends of the plurality of stiffeners close to each other may be set at intervals, and the extension lines of the plurality of stiffeners may be crossed at a preset reference point (as shown in a solid point O in FIG. 12). At this time, the reinforcing structure 318 may be regarded as a radiational reinforcement of the fixing portion 311.

Applicant finds through long-term research: under an equivalent condition (e.g., the size and shape of the fixing portion 311 may be the same, and the distribution shape of the reinforcing structure 318), when the following dimensional relationship between the stiffener and the fixing portion 311 is satisfied, the stiffness of the fixing portion 311 may be effectively increased and the weight of the fixing portion 311 may be well considered. In some embodiments, a ratio between the thickness of the stiffener and the thickness of the fixing portion 311 may be within a closed interval [0.8, 1.2]; a ratio between the width of the stiffener (for example, a width d4 in FIG. 12(*a*)) and the thickness of the fixed portion 311 may be within a closed interval [0.4, 0.6], and a ratio between the spacing of the stiffener and the thickness of the fixed portion 311 may be within a closed interval [1.6, 2.4]. In some embodiments, the thickness of the stiffener may be the same as the thickness of the fixing portion 311, the width of the stiffener may be half the thickness of the fixing portion 311, and the spacing of the stiffeners may be twice the thickness of the fixing portion 311. In some embodiments, the thickness of the fixing portion 311 may be 0.8 mm, and the thickness, width, and spacing of the stiffeners may be 0.8 mm, 0.4 mm, and 1.6 mm, respectively.

It should be noted that the various reinforcing structures shown in FIG. 11 and FIG. 12 may be reasonably combined according to the stiffness requirements of the fixing portion 311, and are not limited here.

Figure 13:
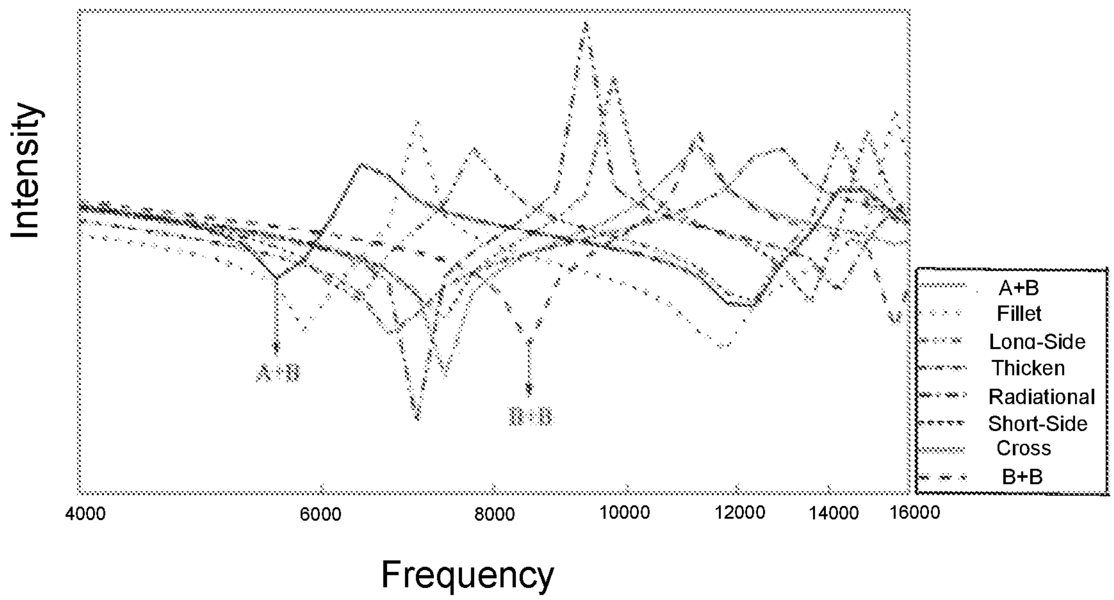
FIG. 13 is a schematic diagram illustrating frequency response curves of exemplary various reinforcing structures in FIG. 11 and FIG. 12 according to some embodiments of the present disclosure.

FIG. 13 is a schematic diagram illustrating frequency response curves of exemplary various reinforcing structures in FIG. 11 and FIG. 12 according to some embodiments of the present disclosure. As shown in FIG. 13, the curve (A+B) indicates that the material of the fixing portion 311 is different from the material of the core shell 21 (e.g., the elastic modulus of the fixing portion 311 may be less than the elastic modulus of the core shell 21), and the fixing portion 311 may not be improved in structure; the curve (B+B) indicates that the material of the fixing portion 311 is the same as the material of the core shell 21 (e.g., the elastic modulus of the fixing portion 311 and the core shell 21 may be equal), the fixing portion 311 is similar in structure to the core shell 21 (e.g., the thicknesses of the fixing portion 311 and the core shell 21 may be the same, and the area of the fixing portion 311 may be also the same as the area of the bottom wall 211). A may correspond to the fixing portion 311, and B may correspond to the bottom wall 211 (i.e., the skin contacted area of the core shell 21); in terms of structure, (A+B) and (B+B) may correspond to that the shell of the ear hanger assembly 31 (specifically, the fixing portion 311) is covered on the core shell 21.

According to FIG. 13, it is no doubt that for the structure (A+B), its resonance valley (which may correspond to the first high frequency valley V) appears at a frequency of about 5500 hz; for the structure (B+B), the resonance valley (which may correspond to the first high frequency valley V) appears at a frequency of about 8400 hz. Obviously, if the structure (A+B) is improved to the structure (B+B), i.e., the material of the fixing portion 311 may be the same as the material of the core shell 21, the structure of the fixing portion 311 may be the same as the structure of the core shell 21 may be similar, the resonance frequency of the structure may be effectively increased.

Further, for the structure (A+B), after the reinforcing structure 318 such as a fillet as shown in FIG. 11(*a*), a thickening as shown in FIG. 11(*b*), a long side reinforcement as shown in FIG. 12(*a*), a short side reinforcement as shown in FIG. 12(*b*), a cross reinforcement as shown in FIG. 12(*c*), and a radial reinforcement as shown in FIG. 12(*d*) is set, the resonance valley of (A+B+the reinforcing structure) may occur in the frequency range of 5500-8400 hz. That is, setting the reinforcing structure 318 on the fixing portion 311 may help to increase the resonance frequency of the structure, that is, setting the reinforcing structure 318 may help to reduce a stiffness difference between the fixing portion 311 and the core shell 21, and may help to improve the sound leakage. It should be noted that the effect of increasing the resonance frequency varies with the structure of the reinforcing structure 318, i.e., the degree of improvement of the sound leakage varies. If the effect of the reinforcing structure 318 on increasing the resonance frequency is ranked from the best to the relatively best, the order is: the cross reinforcement (as shown in FIG. 12(*c*)) >the short side reinforcement (as shown in FIG. 12(*b*))>the radiation reinforcement (as shown in FIG. 12(*d*))>the thicken (as shown in FIG. 11(*b*))>the long side reinforcement (as shown in FIG. 12(*a*))>the fillet (as shown in FIG. 11(*a*)).

Based on the above detailed description, the core 22 may vibrate under the excitation of the electrical signal, and drive the core shell 21 to vibrate with the core 22; when the user wears the acoustic device 200, the bottom wall 211 (i.e., the skin contacted area) of the core shell 21 may contact the user's skin, so that the above vibration may be transmitted to the auditory nerve through the human skull, so that the user may hear the sound played by the acoustic device 200. At this time, in order to ensure the reliability of the vibration transmission process, at least the core shell 21 needs to be able to vibrate with the core shell 22.

Figure 14:
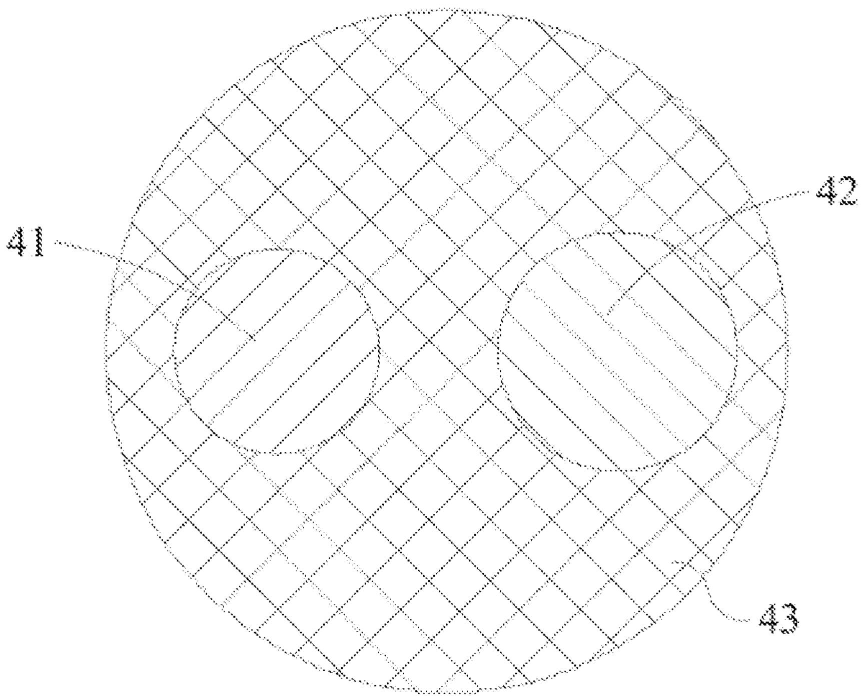
FIG. 14 is a schematic diagram illustrating a sectional structure of an exemplary rear hanger assembly along an III-III direction in FIG. 2 according to some embodiments of the present disclosure.

FIG. 14 is a schematic diagram illustrating a sectional structure of an exemplary rear ear hanger assembly along an III-III direction in FIG. 2 according to some embodiments of the present disclosure. As shown in FIG. 14, the rear ear hanger assembly 40 may include an elastic member 41, a wire 42, and an elastic covering body 43 covering the elastic member 41 and the wire 42. The elastic covering body 43 and the wire 42 may be an integral part made by extrusion molding; the elastic coating body 43 may further provide a threading channel (not shown in FIG. 14), the elastic member 41 may be threaded in the threading channel. Preferably, the threading channel may be formed during the extrusion molding process. In some embodiments, the material of the elastic member 41 may include fiber, plastic, rubber, or metal. In some embodiments, the metal may include spring steel, titanium alloy, titanium nickel alloy, chromium molybdenum steel, or the like. In some embodiments, the material of the elastic covering body 43 may include polycarbonate, polyamide, silica gel, rubber, etc., so that the rear ear hanger assembly 40 may give consideration to the wearing comfort and structural stiffness.

It should be noted that since the elastic member 41 is threaded in the elastic covering body 43 through the threading channel, a region where the elastic member 41 is located in FIG. 14 may be simply regarded as the threading channel in the elastic covering body 43.

Further, the diameter of the threading channel in the natural state may be smaller than the diameter of the elastic member 41. Because the elastic covering body 43 has certain elasticity, the elastic member 41 may elastically expand the threading channel to insert into the threading channel during the insertion of the elastic member 41 into the threading channel, so that the elastic member 41 may be tightly wrapped by the threading channel and kept fixed with the elastic covering body 43 after being inserted into the threading channel to avoid the adverse phenomenon of "indentation" of the rear hanger assembly 40 due to the excessive gap between the elastic covering body 43 and the elastic member 41, especially when the user presses the rear hanger assembly 40, the structural compactness of the rear hanger assembly 40 may be increased.

In some embodiment, the number of the wires may be at least two strands. Each strand of the wire 42 may include a metal wire and an insulating layer (not shown in FIG. 14) covering the metal wire, and the insulating layer may be mainly configured to achieve electrical insulation between the metal wires.

It should be noted that: as shown in FIG. 2, FIG. 3, FIG. 5, and FIG. 9, Since the main control circuit board 50 and the battery assembly 60 may be respectively arranged in the two hang assemblies 30, and the hang assemblies 30 shown in FIG. 3 and FIG. 5 may respectively correspond to the left hang and the right hang of the acoustic device 200, not only the main control circuit board 50 and the battery assembly 60 need to be connected through the wire 42 embedded in the rear hanger assembly 40. Moreover, the core module 210 (specifically, its core 22), and the key 36 corresponding to the ear hanger assembly 30*a* in FIG. 2 (on the left) need to be further connected with the main control circuit board 50 corresponding to the ear hanger assembly 30 in FIG. 2 (on the right) through the wire 42 built into the rear ear hanger assembly 40. The core module 210 (specifically, its core 22 and microphone, which may be configured to pick up the sound in the wearer's environment) corresponding to the ear hanger assembly 30 in FIG. 2 (on the right) also needs to be further connected with the battery assembly 60 corresponding to the ear hanger assembly 30 in FIG. 2 (on the left) through the wire 42 built into the rear ear hanger assembly 40. Therefore, the wire 42 needs to realize the connection of at least the above three circuits.

Based on the above detailed description, the rear ear hanger assembly 40 of some embodiments may be manufactured according to the following process flow:

(1) Provide an extrusion molding device and wires.

On the one hand, a raw material for forming the elastic covering body 43 may be added to the extrusion molding device. In the process of extrusion molding, the raw material of the elastic covering body 43 may at least go through the stages of melting and plasticization, die extrusion molding, shaping, cooling, traction, etc.

On the other hand, the number of wires may be at least two strands to facilitate the connection between the various electronic components in the acoustic device 200. Further, each strand of the wire may include a metal wire and an insulating layer covering the metal wire to facilitate electrical insulation between the metal wires.

(2) The wires may be placed in the extrusion molding device, so that the raw material of the elastic covering body and the wires may obtain the corresponding semi-finished product in the extrusion molding process.

The extrusion molding device may pull the wires so that the elastic covering body 43 may be covered on the wires during the extrusion molding process. Further, the die core may be arranged at a head part of the extrusion molding device, so that the above threading channel may be formed inside the elastic covering body 43 at the same time during the extrusion molding process. Therefore, the above-mentioned semi-finished product may be an integrated structural part of the elastic covering body 43 and the wire 42, and the interior of the elastic covering body 43 may be provided with a threading channel extending substantially along its axis direction.

(3) According to the use requirements of the rear hanger assembly, the above-mentioned semi-finished product may be further cut into a second semi-finished product with the corresponding length.

The actual length of the second semi-finished product may be slightly greater than the length used for the rear hanger assembly, i.e., the second semi-finished product also has a certain margin at this time to facilitate the subsequent processing procedures.

(4) The elastic metal wires may be threaded in the threading channel of the second semi-finished product to produce the rear hanger assembly.

After step 4, it may be not only necessary to provide the rear hanger assembly into a curved structure with a certain shape to facilitate its adaptation to the rear side of the user's head; the two ends of the rear hanger assembly also need to be treated accordingly to facilitate the structural fixing connection between the rear hanger assembly and the hanger assembly, and to realize the circuit connection between the above-mentioned main control circuit board, battery, key, core, first microphone, and second microphone. Therefore, the rear hanger assembly prepared in step 4 may be essentially only a semi-finished product.

In the above way, with the help of the extrusion molding process, not only may a very long semi-finished product be made at one time (specifically, it may be an integral structural part of the elastic covering body 43 and the wire 42), but also a threading channel extending substantially along its axis may be formed inside the elastic covering body 43 at the same time, and then the semi-finished product may be cut into small segments of corresponding length for subsequent processing, the manufacturing efficiency of the rear hanger assembly may be effectively improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as an "data block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. In fact, features of embodiments may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A support assembly for an acoustic device, comprising:

a shell configured to provide a space for accommodating one or more components of the acoustic device; and an interaction assembly configured to realize interaction between a user and the acoustic device, wherein the interaction assembly includes a first component and one or more second components, in response to receiving an operation of the user, the first component is configured to trigger at least one of the one or more second components to cause the acoustic device to perform a function corresponding to the at least one of the one or more second components, wherein the first component includes a bracket provided on an outer wall of a side of the shell; and the shell further includes a first portion, a second portion, and a third portion, wherein the first portion is configured to form the space, the space is configured to accommodate a battery assembly or one or more control circuit assemblies of the acoustic device, the third portion is configured to fix a core module of the acoustic device, the second portion is connected with the first portion and the third portion and is configured to hang on outside of ears of a user; and the second portion is provided with a first groove, the bracket cooperates with the first groove of the second portion to form a wire channel, and a wire extends from the core module to the first portion through the wire channel.

2. The support assembly of claim 1, wherein the at least one of the one or more second components includes a key;

the shell is provided with one or more holes, the key is arranged on an inner wall of the side of the shell provided with the bracket, and the bracket triggers the key under an external pressure to cause the acoustic device to perform the function corresponding to the key, wherein the function corresponding to the key is configured to at least control the acoustic device to switch on/off, control a volume of the acoustic device up or down, or control switching of a playback function of the acoustic device.

3. The support assembly of claim 2, wherein at least one of the one or more holes is opened on the third portion, and the core module is configured to input and/or output sound.

4. The support assembly of claim 3, wherein one end of the first groove communicates with the hole on the third portion, the bracket is fixed and installed in the first groove and at least a portion of the bracket covers the hole on the third portion.

5. The support assembly of claim 4, wherein the bracket and the second portion are in a bent shape.

6. The support assembly of claim 5, wherein the bracket is provided with a second groove on a side facing the shell, so that when the bracket is fixed and installed in the first groove, the second groove and the first groove cooperate with each other to form the wire channel.

7. The support assembly of claim 5, wherein the first groove includes a first segment on the second portion and a second segment on the third portion, a depth of the first segment is greater than a depth of the second segment, the bracket includes an fixing portion corresponding to the first segment and a pressing portion corresponding to the second segment, the thickness of the fixing portion is greater than the thickness of the pressing portion, the second groove is provided with the fixing portion, and the pressing portion is configured to trigger the key.

8. The support assembly of claim 7, wherein the first groove further includes a third segment on the first portion, and the depth of the first segment is greater than a depth of the third segment.

9. The support assembly of claim 8, wherein the first portion further includes an auxiliary member, the auxiliary member is fixed in the first groove and fitted with the bracket.

10. The support assembly of claim 9, wherein the bracket is fixed and installed in the first segment, and the auxiliary member extends into the second segment and the third segment.

11. The support assembly of claim 9, wherein the third segment is provided with a pit at an end of the third segment away from the first segment, and an end of the auxiliary member is tilted from the first groove by pressing the auxiliary member into the pit.

12. The support assembly of claim 11, wherein the bracket covers the first segment and the second segment, the auxiliary member is installed on the bracket, extended into the third segment, and covers the pit.

13. The support assembly of claim 12, wherein the auxiliary member includes a sticker and the sticker is attached to the bracket or the auxiliary member and the bracket are an integral structural part.

14. The support assembly of claim 9, wherein an adhesive strength between the auxiliary member and the bracket is less than a fixing strength between the bracket and the second portion.

15. The support assembly of claim 7, wherein the bracket further includes a first connecting portion connected between the fixing portion and the pressing portion, the first connecting portion bends and extends toward a side away from the shell relative to the fixing portion, and the pressing portion bends and extends toward a side close to the shell relative to the first connecting portion.

16. The support assembly of claim 10, wherein a side of the pressing portion close to the shell is provided with a key bulge, so that when the pressing portion is pressed by an external force, the key bulge triggers the key.

17. The support assembly of claim 7, wherein another end of the fixing portion of the bracket away from the pressing portion is provided with a second connecting portion, and a thickness of the second connecting portion is less than the thickness of the fixing portion.

18. The support assembly of claim 4, wherein the bracket is further provided with a third connecting portion at an end of the bracket close to the third portion, the third connecting portion is configured to form a clamping connection with an inner surface of the side of the third portion with the bracket to prevent an end of the bracket from being lifted the first groove.

19. The support assembly of claim 3, wherein the support assembly further include a seal component, the seal component is arranged between the key and the third portion.

20. An acoustic device, comprising:

a core module, a battery assembly, and a support assembly, wherein the support assembly includes:

a shell configured to provide a space for accommodating one or more components of the acoustic device; and an interaction assembly configured to realize interaction between a user and the acoustic device, wherein the interaction assembly includes a first component and one or more second components, in response to receiving an operation of the user, the first component is configured to trigger at least one of the one or more second components to cause the acoustic device to perform a function corresponding to the at least one of the one or more second components, wherein the first component includes a bracket provided on an outer wall of a side of the shell; and the shell further includes a first portion, a second portion, and a third portion, wherein the first portion is configured to form the space, the space is configured to accommodate a battery assembly or one or more control circuit assemblies of the acoustic device, the third portion is configured to fix a core module of the acoustic device, the second portion is connected with the first portion and the third portion and is configured to hang on outside of ears of a user; and the second portion is provided with a first groove, the bracket cooperates with the first groove of the second portion to form a wire channel, and a wire extends from the core module to the first portion through the wire channel;

wherein the core module is provided at an end of the support assembly, and the battery assembly is provided at another end of the support assembly.

* * * * *